US012501306B2

United States Patent
Haartsen

(10) Patent No.: US 12,501,306 B2
(45) Date of Patent: Dec. 16, 2025

(54) SYSTEMS AND METHODS FOR MANAGING AN ENVIRONMENT INCLUDING BOTH VOICE COMMUNICATIONS AND STREAMING AUDIO COMMUNICATIONS

(71) Applicant: Hewlett-Packard Development Company, L.P., Spring, TX (US)

(72) Inventor: Jacobus Cornelis Haartsen, Santa Cruz, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 493 days.

(21) Appl. No.: 17/913,320

(22) PCT Filed: Mar. 30, 2020

(86) PCT No.: PCT/US2020/025816
§ 371 (c)(1),
(2) Date: Sep. 21, 2022

(87) PCT Pub. No.: WO2021/201832
PCT Pub. Date: Oct. 7, 2021

(65) Prior Publication Data
US 2023/0137607 A1 May 4, 2023

(51) Int. Cl.
*H04W 28/02* (2009.01)
*H04L 65/80* (2022.01)
*H04W 4/80* (2018.01)

(52) U.S. Cl.
CPC ......... *H04W 28/0236* (2013.01); *H04L 65/80* (2013.01); *H04W 4/80* (2018.02)

(58) Field of Classification Search
CPC ............... H04W 28/0236; H04W 4/80; H04W 28/0231; H04W 28/082; H04W 28/0967
See application file for complete search history.

(56) References Cited

U.S. PATENT DOCUMENTS

| 5,241,548 A | 8/1993 | Dillon et al. |
| 5,426,653 A | 6/1995 | Hayes et al. |

(Continued)

FOREIGN PATENT DOCUMENTS

| DE | 202010009381 U1 | 11/2010 |
| EP | 0891662 A1 | 1/1999 |

(Continued)

OTHER PUBLICATIONS

International Search Report issued in corresponding international application No. PCT/US2020/025816 mailed Jun. 17, 2020 (3 pages).

(Continued)

*Primary Examiner* — Ayodeji O Ayotunde
(74) *Attorney, Agent, or Firm* — Quarles & Brady LLP

(57) ABSTRACT

Systems and methods are provided for managing an environment (e.g., a call center) including both voice users and streaming audio users (e.g., streaming music) using a common wireless protocol, e.g., Bluetooth. The system may include multiple base stations communicating with multiple user devices (e.g., wireless headsets) to define a plurality of wireless audio links. A central controller in communication with the base stations may receive wireless link data associated with the wireless audio links, determine a current count of voice users versus streaming audio users, generate channel assignment data specifying a first frequency channels designated for voice users and second frequency channels designated for streaming audio users, and communicate such channel assignment data to the base stations. Each base station may then selectively utilize particular frequency channel(s) based on the channel assignment data and the type of audio communication (e.g., voice or streaming audio) currently used by the respective user.

23 Claims, 18 Drawing Sheets

(56) References Cited

U.S. PATENT DOCUMENTS

| | | |
|---|---|---|
| 5,497,382 A | 3/1996 | Levine et al. |
| 5,745,502 A | 4/1998 | Khayrallah et al. |
| 5,870,406 A | 2/1999 | Ramesh et al. |
| 9,397,793 B2 | 7/2016 | Hennebert |
| 9,699,741 B1 | 7/2017 | Chu et al. |
| 2004/0224650 A1 | 11/2004 | Hundal et al. |
| 2005/0276249 A1 | 12/2005 | Damnjanovic et al. |
| 2006/0020869 A1 | 1/2006 | Desai et al. |
| 2006/0092871 A1 | 5/2006 | Nishibayashi et al. |
| 2007/0162812 A1 | 7/2007 | Herrmann |
| 2009/0154388 A1 | 6/2009 | Jalloul et al. |
| 2010/0022263 A1 | 1/2010 | Stamoulis et al. |
| 2011/0110340 A1 | 5/2011 | Lakkis |
| 2014/0059407 A1 | 2/2014 | Zopf et al. |
| 2014/0094183 A1 | 4/2014 | Gao et al. |
| 2015/0111610 A1 | 4/2015 | Hwang et al. |
| 2016/0072949 A1 | 3/2016 | Kannappan et al. |
| 2016/0087882 A1 | 3/2016 | Bragg |
| 2016/0191093 A1* | 6/2016 | Larsen ................ H04M 1/6066 455/41.2 |
| 2016/0323922 A1 | 11/2016 | Park et al. |
| 2017/0134138 A1 | 5/2017 | Madhavan et al. |
| 2017/0142535 A1 | 5/2017 | Aggarwal et al. |
| 2017/0245166 A1 | 8/2017 | Bienas et al. |
| 2019/0090257 A1 | 3/2019 | Han et al. |
| 2019/0150001 A1 | 5/2019 | Jen et al. |
| 2019/0174557 A1 | 6/2019 | Ueda et al. |
| 2019/0342068 A1 | 11/2019 | Haartsen |
| 2020/0021328 A1* | 1/2020 | Haartsen .............. H04B 1/7143 |

FOREIGN PATENT DOCUMENTS

| | | |
|---|---|---|
| EP | 1133094 A2 | 9/2001 |
| EP | 3041305 A | 7/2016 |
| WO | 93/00671 A1 | 1/1993 |
| WO | 97/37459 A1 | 10/1997 |
| WO | 2020/092944 A1 | 5/2020 |

OTHER PUBLICATIONS

Written Opinion of the International Searching Authority issued in corresponding international application No. PCT/US2020/0025816 mailed Jun. 17, 2020 (8 pages).

International Search Report and Written Opinion issued in corresponding International Application No. PCT/US2020/016940 dated May 25, 2020 (24 pages).

Search Report for EP Application No. 22151250.2, 9 pages, dated Jun. 7, 2022.

* cited by examiner

Mono Voice

Stereo Voice

Streaming Music

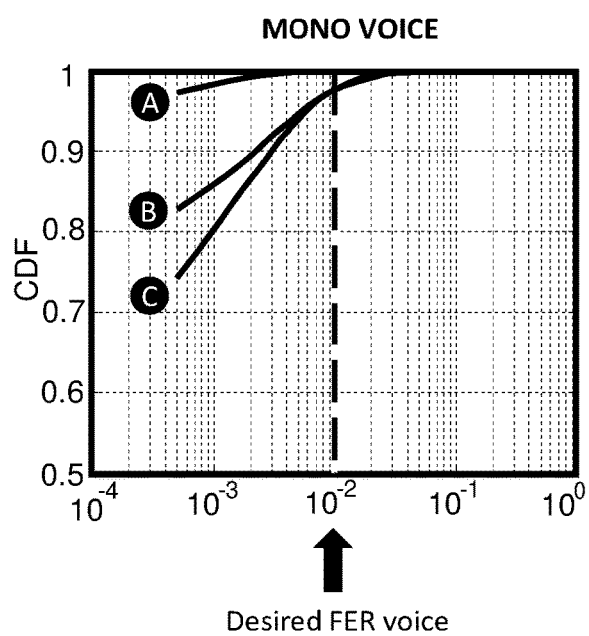
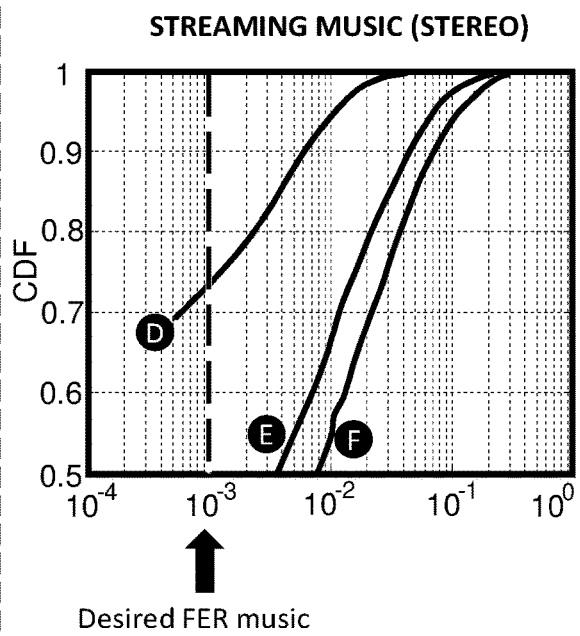
FIG. 12A
FIG. 12B

Shared spectrum approach: voice and streaming audio share non-WiFi channels

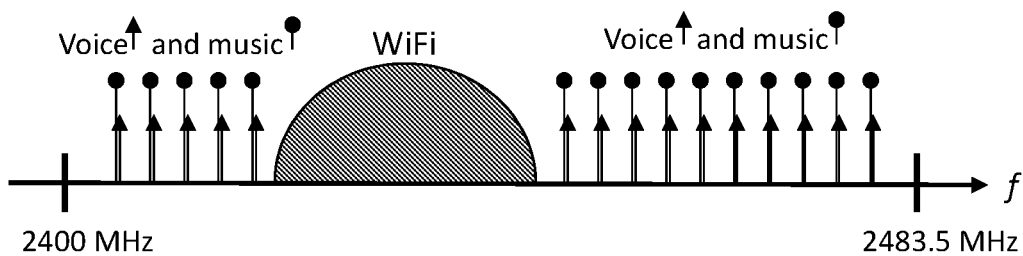

*FIG. 13A (Prior Art)*

Density performance for shared spectrum approach

1300

| Mono Voice and Streaming Audio (Music) | | |
|---|---|---|
| Shared spectrum | Outage voice user @ 1% FER | 0.3% |
| 50 carriers | Outage voice user @ 0.1% FER | 50% |

1302

| Stereo Voice and Streaming Audio (Music) | | |
|---|---|---|
| Shared spectrum | Outage voice user @ 1% FER | 2% |
| 50 carriers | Outage voice user @ 0.1% FER | 70% |

<u>Operational parameters</u>

Grid size: 8x8 (i.e. 64 base stations)
Inter-base spacing: 4m (corresponding to 13ft)
One WiFi AP: 50 Bluetooth carriers to hop over
Traffic loading voice: 50% (0.5 Erlangs per base station)
Traffic loading music: All connections not engaged in a voice link
No long-distance roaming: Headset placement on average 1.4m from base
Synchronization: Unsynchronized base stations

*FIG. 13B (Prior Art)*

Voice and streaming audio assigned to separate carrier groups

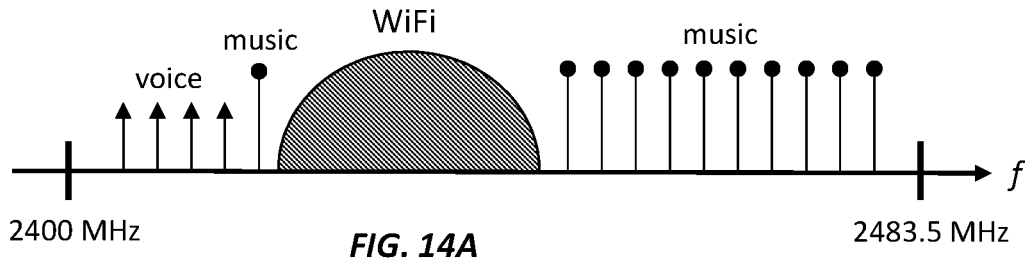

FIG. 14A

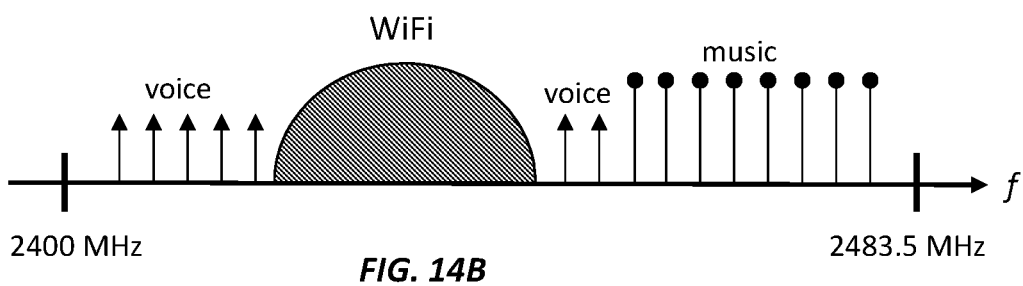

FIG. 14B

Density performance – disjunct spectrum

1400

| Mono Voice and Streaming Audio (Music) | | |
|---|---|---|
| 13 voice carriers | Outage voice user @ 1% FER | 5% |
| 37 music carriers | Outage voice user @ 0.1% FER | 21% |

Synced: 19%

1402

| Stereo Voice and Streaming Audio (Music) | | |
|---|---|---|
| 22 voice carriers | Outage voice user @ 1% FER | 5% |
| 28 music carriers | Outage voice user @ 0.1% FER | 33% |

Synced: 28%

Operational parameters

Grid size: 8x8 (i.e. 64 base stations)
Inter-base spacing: 4m (corresponding to 13ft)
One WiFi AP: 50 Bluetooth carriers to hop over
Traffic loading voice: 50% (0.5 Erlangs per base station)
Traffic loading music: All connections not engaged in a voice link
No long-distance roaming: Headset placement on average 1.4m from base
Synchronization: Unsynchronized base stations

FIG. 14C

Voice and streaming audio assigned to separate and dispersed carriers

SYSTEMS AND METHODS FOR MANAGING AN ENVIRONMENT INCLUDING BOTH VOICE COMMUNICATIONS AND STREAMING AUDIO COMMUNICATIONS

TECHNICAL FIELD

The present invention relates to the field of wireless communications, and more particularly, to systems and methods for managing wireless channel assignment in a mixed-user environment including both voice users and streaming audio (e.g., music) users, such as a call center, for example.

BACKGROUND

In enterprise applications, achievable user density in wireless audio communications (including voice communications) is an important figure of merit for systems using Bluetooth Classic, Bluetooth derivatives such as Bluetooth Low Energy (BLE), Digital European Cordless Telecommunications (DECT), and other similar packet-based radio systems. One factor adversely impacting achievable user density is interference. For example, since the first release of the standard in 1999, the Bluetooth wireless technology has seen a major uptake for use in short-range communications. Making use of unlicensed spectrum in the 2.4 GHz ISM band, Bluetooth must share the spectrum with other users, including other Bluetooth users and in some cases Wi-Fi communications.

In a Bluetooth system, voice is compressed and sent in a series of short packets to the receiver. A packet may be interfered by packets from other Bluetooth transmitters, or by signals from other transmitters in the ISM band. A major player in the 2.4 GHz ISM band is the Wi-Fi system based on the IEEE 802.11 standard. Whether a packet is lost depends on 1) the strength of the interference power with respect to the strength of the intended received power, 2) whether the packets (partly) overlap in time, 3) whether the packets make use of the same (or near-adjacent) carrier frequency. The quality of a Bluetooth connection may be defined by an error rate experienced at the wireless receiver (herein, "Data Error Rate" or "DER"), for example, a Bit Error Rate (BER), a Packet Error Rate (PER), or a Frame Error Rate (FER) experienced at the Bluetooth receiver. Being an ad-hoc system, a conventional Bluetooth transmitter does not coordinate its communication with other systems. Instead, it relies on its frequency hopping capability to deal with interference.

During the first years of Bluetooth, voice communication was the major use case. But a few years after its introduction, the A2DP profile was released, capable of streaming compressed audio data, e.g., stereo music, to a headset. Audio streaming via Bluetooth has grown rapidly in recent years. In a typical enterprise scenario, e.g., a call center, users not currently engaged in voice communications commonly stream audio (e.g., music or movie audio) from their base station to their headsets.

A major difference between voice and streamed audio (e.g., music) is the link protocol used in a piconet. For voice communications, a bi-directional synchronous eSCO link is used, providing time slots reserved for voice packets. The eSCO links use fixed intervals where the same pattern of transmissions and retransmissions is repeatedly applied. In contrast, audio streaming via Bluetooth is carried over an asynchronous ACL link A streamed audio packet (e.g., music packet) can occur on any time slot. The traffic is highly asymmetric with long packets in the streaming direction and short ACK packets in the return direction.

In a typical enterprise usage scenario, numerous Bluetooth base devices (also referred to herein as base stations) are located within a building space. To each base device, a single headset is connected, together forming an independent piconet. The headsets are scattered around the base devices. A common goal in a enterprise system is to increase or maximize the density of Bluetooth users in the available physical space, without a significant portion of the users experiencing noticeable interference.

Typical scenarios where user density is an issue are interference-limited. In an interference-limited scenario, the available Carrier-to-Interference ratio (C/I) experienced at the receiver is dominated by the accumulated interference produced by the other users sharing the same area and spectrum. The experienced C/I ratio is a local parameter and is determined by the distance between the receiver and its transmitter (determining the intended received carrier signal power C) and the distance to active, nearby interfering transmitters, together creating the (unwanted) interfering power I. The quality of the link expressed in DER (e.g., BER, PER, or FER) is inversely proportional to the C/I ratio. The C/I ratio is usually considered to be a statistical parameter.

Some systems or environments including multiple Bluetooth users, e.g., certain call centers, may specify required or target metrics regarding cross-user interference. For example, some system may set a required or target maximum DER for a specified percentile of users, or in other words, a requirement or target that at least N % of users experience a DER of Y % or less. For instance, a system may require a PER or FER of ≤1% for at least 95% of users. Each user experiencing more than the threshold level of interference (in this example, 1%) may be referred to as an "outage."

It should be understood that the values of ≤1% PER or FER and 95% of users are examples only, and each different system or environment may specify any suitable values for required or target limits on interference. For example, a system may specify a more strict requirement that at least 99% of users experience a PER or FER of 0.1% or less. The required or target interference limit values may define or influence the maximum allowable number of active users in the respective system. In general, the more strict the interference requirements, the lower the allowable number of active users for a fully loaded system.

FIGS. 1A and 1B are graphs showing two example cumulative distribution function (CDF) curves of frame error rate (FER) experienced by a group of Bluetooth users in an example environment, e.g., an example call center. For the purpose of this example, a required or target FER of ≤1% is assumed for this example environment.

FIG. 1A shows an example CDF curve 10 indicating that only 58% of users experience the required or target FER of ≤1%. Thus, CDF curve 10 indicates an outage of 42% (i.e., 42% of users have an FER>1%). In contrast, FIG. 1B shows an example CDF curve 20 indicating that 95% of users experience the required or target FER of ≤1%. Thus, CDF curve 10 indicates an outage of 5%.

Modern wireless systems can be reconfigured on the fly to give the best performance under different circumstances. The modulation and coding schemes can be adapted to provide higher or lower data rates with more or less protection against interference. Furthermore, different audio codec rates can be applied, impacting audio quality, interference robustness, but also the required channel capacity.

Lastly, packet intervals can be changed to adapt the duty cycle; the latter may affect the latency though.

As an example, in a relative quiet environment, the wireless system may use the highest modulation scheme without error correction schemes, a high-rate audio codec for optimal audio performance, and a low duty cycle for low latency. This will require quite some channel capacity, but in a quiet environment, the capacity does not have to be shared among a lot of users. If the number of users increases, the (limited) spectral capacity needs to be divided among more users, creating also more mutual interference.

In the prior art, each headset and base station makes local measurements related to interference conditions and makes local decisions how to respond based on these measurements. This individualized, distributed control may lead to undesirable situations: during a quiet period, greedy users may grab the capacity in the area for high-quality, wide bandwidth codecs. Users arriving later may experience a lot of interference and are forced to use a low-quality, narrowband codec. So, the capacity is not evenly distributed among users.

In addition, in the prior art, each wireless link (between a headset and base station) in an environment typically share the same available communication spectrum, e.g., the Bluetooth frequency spectrum. In mixed-user environments including both voice users (e.g., call center headset users engaged in a voice call) and streaming audio users (e.g., call center headset users streaming music or other audio, e.g., in between voice calls), interference effects between the various users may result in undesirable or unacceptable outage rates, particularly with increasing user density. High outage rates for voice users may be particularly problematic in certain environments, such as call centers, for example.

As a result, improved methods and apparatuses for managing user density in wireless audio communications are needed, in particular, an object exists for improving link quality while allowing a high user density in mixed-user environments, e.g., including both voice and streaming audio (e.g., music) headset users.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

The above object and other objects are solved by the invention as defined in the independent claims. The dependent claims and the following specification discuss various embodiments.

According to one aspect of the invention, a method is provided for managing audio communications in a mixed-user wireless audio environment, the environment providing multiple wireless audio links (e.g., Bluetooth links) communicating audio data between multiple wireless communications devices (e.g., Bluetooth headsets and base stations), the wireless audio links including at least one voice link communicating voice data and at least one streaming audio link communicating streaming audio data. A central controller receives wireless link data for at least one of the wireless audio links, the wireless link data link data for each wireless audio link including (a) link usage data indicating whether the wireless audio link is a voice link or a streaming audio link and/or (b) link quality data indicating a quality of the respective wireless audio link, and the central controller may use this link quality data. Based at least on this wireless link data, the central controller may generate channel assignment data defining (a) a set of voice carriers designated for voice links, and comprising a first set of frequency channels (e.g., a first subset of available Bluetooth frequency channels) and (b) a set of streaming audio carriers designated for streaming audio links and comprising a second set of frequency channels (e.g., a second subset of available Bluetooth frequency channels, separate from the first subset of channels designated for voice links) The central controller may then communicate at least a portion of this channel assignment data to at least one of wireless communication devices (e.g., Bluetooth base stations), such that the wireless communication devices may adjust their operation to comply with the channel assignment data.

By separating voice users from streaming audio (e.g., music) users into a first set of carriers (frequency channels) designated for voice links and a second set of carriers (frequency channels) designated for streaming audio links, interference between the various wireless links may be significantly reduced, as compared with conventional systems in which all users share the full available frequency spectrum for the relevant wireless communication protocol (e.g., Bluetooth). In addition, by assigning and/or dynamically adjusting the carrier assignments (e.g., between voice links and steaming audio links) as a function of current link usage data and/or measured link quality data, interference between the various wireless links may be further reduced, and optimized according to defined targets and priorities (for example, by prioritizing the data error rate or outage rate for voice users over the data error rate or outage rate for music users, e.g., in a call center environment). Further, as a result of reducing the interference between the various wireless links in an environment, the possible user density in the environment may be increased, while achieving defined interference or performance targets.

In another aspect, a system is provided for managing audio communications in a mixed-user wireless audio environment including multiple wireless audio links communicating audio data between multiple wireless communications devices according to a wireless communications protocol (e.g., Bluetooth) having an available frequency spectrum, wherein the multiple wireless audio links include at least one voice link communicating voice data and at least one streaming audio link communicating streaming audio data. The system includes a central controller including a processor and memory. The processor is configured to receive wireless link data including, for at least one wireless audio link, (a) link usage data indicating whether the respective wireless audio link is a voice link or a streaming audio link and/or (b) link quality data indicating a quality of the respective wireless audio link. The processor is further configured to generate or adjust channel assignment data based at least on the received wireless link data, the channel assignment data designating a set of voice channels in the available frequency spectrum for voice links, and designating a different set of streaming audio channels in the available frequency spectrum for streaming audio links. The processor may then communicate the channel assignment data to at least one of the wireless communication devices.

In another aspect, a system is provided for managing audio communications communicated via a communications protocol (e.g., Bluetooth) using a defined frequency spectrum including a set of frequency channels. The system includes multiple base stations and a central controller communicatively coupled to the multiple base stations. The multiple base stations are configured for wireless communication of audio data with at least one corresponding client device to thereby define multiple wireless audio links for communicating audio data. The central controller communicatively includes a processor and memory. The processor is configured to receive wireless link data including (a) link usage data from at least a subset of the base stations, indicating whether each respective wireless audio link is a voice link carrying voice communications or a streaming audio link carrying streaming audio data and/or (b) link quality data from the base stations, indicating a quality of each respective wireless audio link. The processor is configured to generate or adjust channel assignment data based on the received wireless link data, the channel assignment data designating a set of voice channels in the available frequency spectrum for voice links, and designating a different set of streaming audio channels in the available frequency spectrum for streaming audio links. The processor may then communicate the channel assignment data to at least one base station. Each base station may then control, based on channel assignment data received from the central controller, one or more frequency channels used by the base station for audio communications with at least one corresponding client device.

BRIEF DESCRIPTION OF THE DRAWINGS

The present invention will be readily understood by the following detailed description in conjunction with the accompanying drawings, wherein like reference numerals designate like structural elements.

FIG. 12A is a graph showing interference caused by wireless voice transmissions on other wireless voice and streaming music transmissions.

FIG. 12B is a graph showing interference caused by wireless streaming music transmissions on other wireless voice and streaming music transmissions.

FIG. 13A is a graph showing an example Bluetooth carrier distribution according to a conventional shared spectrum approach, in which voice users and streaming audio users share the same Bluetooth spectrum assignment.

FIG. 13B shows example interference effects resulting from the conventional shared spectrum approach shown in FIG. 13A.

FIGS. 14A and 14B are graphs showing example Bluetooth carrier distributions according to one embodiment of the invention, in which separate clusters of carriers are assigned to voice users and streaming audio users.

FIG. 14C shows example interference effects resulting from the clustered carrier assignment approach shown in FIGS. 14A and 1B.

DETAILED DESCRIPTION

Figure 1A:
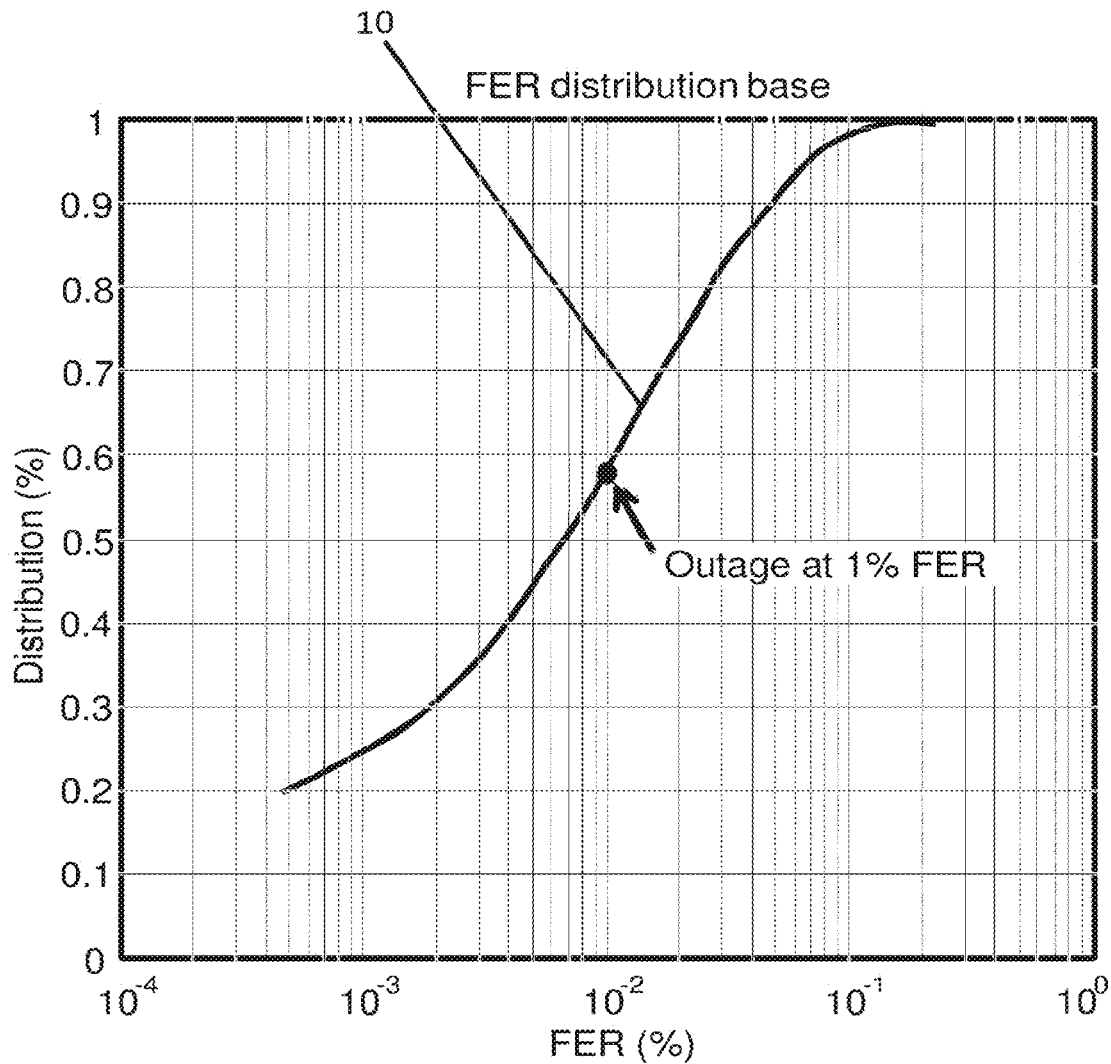
FIGS. 1A and 1B are graphs of example cumulative distribution functions (CDFs) of interference experienced by Bluetooth users in an example environment, e.g., a call center.
Figure 1B:
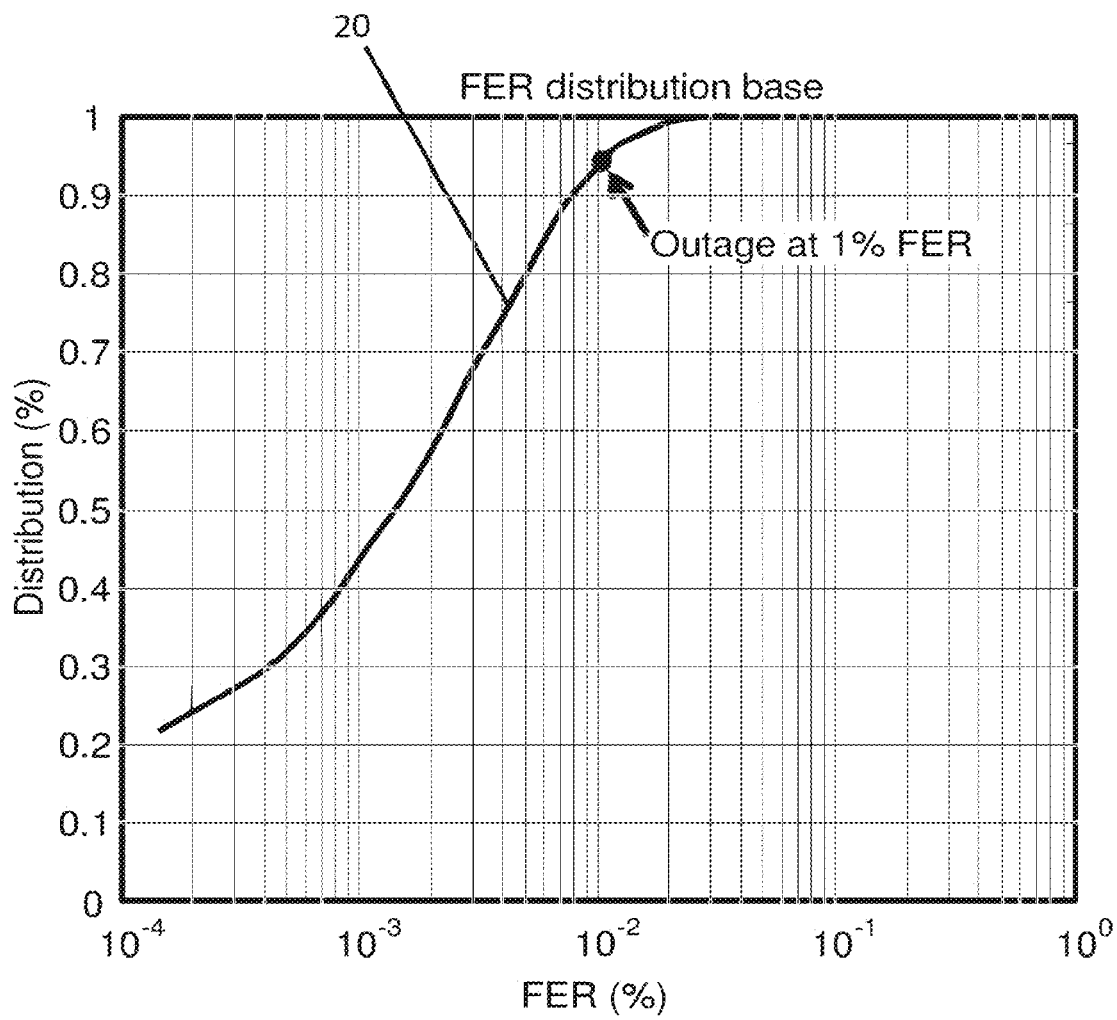

Methods and apparatuses for optimizing link settings to improve wireless interference and/or user density in wireless audio communications are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example embodiment, a method for wireless link management includes receiving at a central controller a plurality of link data associated with a plurality of wireless links between a plurality of first communication devices and a plurality of second communication devices. In one embodiment, the first communication devices are base stations and the second communication devices are client devices. The method includes identifying a global system performance from the plurality of link data utilizing a link quality parameter. The method further includes, responsive to the global system performance, generating one or more modified link settings for a first wireless link between a first communication device and a second communication device. The first communication device is selected from the plurality of first communication devices and the second communication device is selected from the plurality of second communication devices. The method further includes transmitting from the central controller to the first communication device or the second communication device the one or more modified link settings for the first wireless link for implementation at the first communication device or the second communication device.

As used herein, a "central controller" means a controller device or system that is communicatively connected to multiple communication devices (e.g., Bluetooth base stations) for directly or indirectly controlling one or more operational aspects of such communication devices. For example, as discussed herein, a central controller may receive data from multiple Bluetooth base stations, analyze such data, and based on such analysis, send control information to the Bluetooth base stations, which may then adjust or otherwise control their operation based on such control information. As one example (discussed in more detail here), each Bluetooth base station may control the Bluetooth carriers used for wireless link(s) with that base station based on the current usage of such wireless link(s), e.g., voice communications or streaming audio communications. The term "central" is not intended to imply any particular location with respect to the multiple communication devices to which the controller is communicatively connected. For example, a central controller may be located at or near one, some, or all of the multiple communication devices, or may be remote from the multiple communication devices.

In one example embodiment, a system includes a central controller and a first communication device. The central controller includes a central controller processor, a central controller wireless transceiver, a central controller antenna, and a central controller memory storing one or more system link management applications executable by the central controller processor. The one or more system link management applications include instructions to (a) receive a plurality of link data associated with a plurality of wireless links between a plurality of first communication devices and a plurality of second communication devices, (b) identify a global system performance from the plurality of link data utilizing a link quality parameter, and (c) responsive to the global system performance, generate one or more modified link settings for one or more wireless links in the plurality of wireless links.

The first communication device selected from the plurality of first communication devices includes a first communication device processor, and one or more first communication device wireless transceivers configured for wireless communications with the central controller and a second communication device, the second communication device included in the plurality of second communication devices. In one embodiment, the first communication device is a base station and the second communication device is a client device. The first communication device further includes a first communication device antenna, and a first communication device memory storing one or more first communication device link management applications executable by the first controller processor.

The one or more first communication device link management applications include instructions to (a) transmit a first wireless link data to the central controller, the first wireless link data associated with a first wireless link between the first communication device and the second communication device, wherein the first wireless link data is included in the plurality of link data received at the central controller, (b) receive from the central controller one or more modified link settings for the first wireless link between the first communication device and the second communication device, (c) implement the one or more modified link settings at the first communication device, and (d) transmit a data between the first communication device and the second communication device over the first wireless link utilizing the one or more modified link settings.

In one example embodiment, a method for wireless link management includes transmitting a first wireless link data to a central controller, the first wireless link data associated with a first wireless link between a first communication device and a second communication device, wherein the first wireless link data is included in a plurality of link data received at the central controller. The method includes receiving from the central controller one or more modified link settings for the first wireless link between the first communication device and the second communication device, the one or more modified link settings generated responsive to identifying a global system performance from the plurality of link data. The method further includes implementing the one or more modified link settings at the first communication device, and transmitting a data between the first communication device and the second communication device over the first wireless link utilizing the one or more modified link settings.

In one example embodiment, in order to optimize both user density and audio quality, a central controller is utilized with a system of headsets and base stations. All transceivers (i.e., all headsets and base stations) are in contact with the central controller. Each headset has a short-range radio link to its corresponding base station. This link can be based on Bluetooth (Classic or LE), DECT, WiFi, or another wireless technology. In addition to the mutual link, each headset and/or base station has a low-rate connection to the central controller. In one embodiment, the headset has no direct connection to the central controller but conveys the relevant data to its base station which in turn forwards this to the central controller, together with its own information. This low-rate connection could, for example, be based on the Bluetooth Low-Energy Long-Range mode (peak rate of 125 kb/s but with a link budget 13 dB better than ordinary Bluetooth LE) that could cover the entire floor. The overhead is provided for the connections to the central controller. Reporting intervals may be several minutes or longer. The dynamics are determined by the rate new calls are initiated and ongoing calls are released.

Each headset and/or base station can inform the central controller of its current conditions, including (a) RSSI value (indicating how much intended power is received), (b) interference experienced (e.g. by providing DER information (e.g., BER and PER data)), (c) interference power received in other parts of the spectral band (i.e. on carrier frequencies not used for the current connection between headset and base station), (d) currently used modulation scheme, coding scheme, audio codec type, and other link parameters used on the link between the headset and the base station, e.g., the number of carrier frequencies the system using for the currently employed frequency-hopping protocol, and (e) audio quality metrics like PESQ/POLQA/MOS.

By gathering this information from all headsets and base stations, the central controller determines the overall performance of the system as a whole. A distribution is created, showing how many users experience acceptable link quality. For example, a cumulative distribution function is generated as the result of the data gathered in the central controller. The cumulative distribution function shows the distribution of DER over the different (local) links between headsets and base stations.

In a further embodiment, the data collected in the central controller is also used for monitoring the system over time, creating a labeled data set for which machine learning and/or other big data techniques are applied to give indications how to adjust the link parameters for optimal performance as well as other nonobvious insights. Specifically, system performance is advantageously improved by the central controller that collects environmental, device setting, and audio quality statistical data. The system employs statistical calculations and/or more comprehensive machine learning techniques to determine and deploy the configuration to individual transceivers in order to improve the overall density and link quality. Additionally, assuming a separate cloud-based audio analytics system that is deployed to monitor audio quality through MOS (mean opinion score) or other audio perceptual model, the data in the central controller is used to map the DER or other link quality metrics to validate the thresholding in the model. This then provides an offline way to label the data set from the central controller with more comprehensive and computationally intensive audio quality analytics. This offline learning can be used to update the link management application that runs locally on the on the base and/or client device.

As discussed above, some wireless communications environments include both voice users and streaming audio (e.g., music) users, which is referred to herein as a mixed-user environment. For example, in a call center with multiple wireless headset users engaged in voice calls, one or more users may stream audio (e.g., music) to their headset, e.g., in between voice calls. Both voice users and streaming audio users in a mixed-user environment may experience interference from other voice and streaming users in the environment. Interestingly, the inventor has discovered that voice users generally have a greater interference effect than streaming music users on other voice users and also on other streaming music users.

Some embodiments of the present invention are configured to reduce or minimize interference between the various users in a mixed-user environment, which may increase or optimize the possible user density in the environment. In particular, some embodiments provide systems and methods to separate voice users from streaming audio (e.g., music) users into a first set of carriers (e.g., a first set of available Bluetooth frequency channels) assigned to voice links and a second set of carriers (e.g., a second set of available Bluetooth frequency channels) assigned to streaming audio links, which may significantly reduce interference between the various wireless links, for example as compared with conventional systems in which all users share the full available frequency spectrum.

In addition, in some embodiments a central controller is configured to assign and/or dynamically adjust the carrier assignments (e.g., between voice and steaming audio) as a function of current link usage data (e.g., whether each headset user is currently a voice user, music user, etc.) and/or measured link quality data (e.g., DER experienced by each headset user) received from base station(s) connected to the central controller. Such dynamic adjustment of carrier assignments may further reduce interference between the various wireless headset users, and may thus increase the possible user density in the relevant environment, e.g., a call center.

According to one embodiment of the invention, a method is provided for managing audio communications in a mixed-user wireless audio environment including multiple wireless audio links (e.g., Bluetooth links) communicating audio data between multiple wireless communications devices (e.g., Bluetooth headsets and base stations), the wireless audio links including at least one voice link communicating voice data and at least one streaming audio link communicating streaming audio data. A central controller receives wireless link data for at least one of the wireless audio links, the wireless link data link data for each wireless audio link including link usage data indicating whether the wireless audio link is a voice link or a streaming audio link Based at least on this wireless link data, the central controller may generate channel assignment data defining (a) a set of voice carriers designated (assigned) for voice links, and comprising a first set of frequency channels (e.g., a first subset of available Bluetooth frequency channels) and (b) a set of streaming audio carriers designated (assigned) for streaming audio links and comprising a second set of frequency channels (e.g., a second subset of available Bluetooth frequency channels, separate from the first subset of channels assigned to voice communications). The central controller may then communicate at least a portion of this channel assignment data to at least one of wireless communication devices (e.g., Bluetooth base stations), such that the wireless communication devices may adjust their operation to comply with the channel assignment data.

By separating voice users from streaming audio (e.g., music) users into a first set of carriers (frequency channels) designated for voice links and a second set of carriers (frequency channels) designated for streaming audio links, interference between the various wireless links may be significantly reduced, as compared with conventional systems in which all users share the full available frequency spectrum for the relevant wireless communication protocol (e.g., Bluetooth). In addition, by assigning and/or dynamically adjusting the carrier assignments (e.g., between voice and steaming audio) as a function of current link usage data and/or measured link quality data, interference between the various wireless links may be further reduced, and optimized according to defined targets and priorities (for example, by prioritizing the data error rate or outage rate for voice users over the data error rate or outage rate for music users, e.g., in a call center environment). Further, as a result of reducing the interference between the various wireless links in an environment, the possible user density in the environment may be increased, while achieving defined interference or performance targets.

In some embodiments, the received wireless link data for each wireless audio link further includes link quality data indicating a quality of the respective wireless audio link, and the central controller may use this link quality data, along with the link usage data, for generating the channel assignment data.

In an embodiment in which the central controller receives link quality data from the wireless base station(s), the central controller may identify link quality data associated with voice link(s) (e.g., distinguished from link quality data associated with streaming audio links), comparing the voice link quality data with defined target metric(s) for voice links, and adjusting one or more carriers assignments based on such comparison analysis.

For example, the link quality data received at the central controller may indicate data error rate (DER) information for at least some wireless audio links. Using this information, the central controller may calculate a collective "outage" rate for voice links, representing a number or percentage of voice links having a DER above a defined threshold value, e.g., 1% DER. The central controller may then compare this outage rate a target (e.g., maximum) outage rate for voice links, and adjust an assignment of one or more carriers based on the results of this comparison.

Similarly, the central controller may identify link quality data associated with streaming audio link(s) (e.g., distinguished from link quality data associated with voice links), analyze the streaming audio link quality data with respect to defined target metrics for streaming audio links (e.g., by comparing DER data of each voice link with a threshold of 0.1% DER, and then calculating an outage rate for all streaming audio links exceeding the 0.1% DER threshold), and adjusting one or more carriers assignments based on such analysis.

In some embodiments, each wireless audio link comprises a link between a wireless base station and a wireless headset according to any suitable wireless communication protocol. For example, each wireless audio link may comprise a link between a Bluetooth base station and a Bluetooth headset. In other embodiments, each wireless audio link may comprise a Digital Enhanced Cordless Telecommunications (DECT) link, or an IEEE 802.11 (WiFi) link.

In some embodiments, link quality data for wireless audio links may indicate at least one of signal strength information, interference information, or data error rate information for data received by at least one wireless device associated with the wireless link, for example a wireless headset or corresponding base station.

In some embodiments, base stations may communicate wireless link data (e g, link usage data and/or link quality data) to the central controller via a Bluetooth low energy channel or other low-rate control channel, to thereby reduce the energy or data bandwidth used for such signaling.

In some embodiments, each wireless audio link comprises a link between a base station and a user audio device, and each base station is configured to dynamically control the frequency channel(s) used for the audio link with a connected user audio device (e.g., wireless headset), based on (a) channel assignment data received from the central controller and (b) whether the respective audio link is currently a voice link or a streaming audio link.

As discussed above, the central controller may be connected to multiple base stations and configured to manage channel assignments for the multiple wireless audio links. In some embodiments, the central controller may assign channels assigned to voice links (referred to herein as voice channels) and channels assigned to streaming audio links (referred to herein as streaming audio channels) in a clustered manner, e.g., by assigning channels to define a consecutive group of voice channels and a separate consecutive group of streaming audio channels. In other embodiments, the central controller may assign channels to disperse a set of voice channels with a set of streaming audio channels in an intermixed manner, such that at least one voice channel is located between two streaming audio channels along the frequency spectrum of the wireless communication protocol.

In some embodiments, the multiple wireless audio links managed by the central controller are short-range wireless links and comprise at least one of (a) a plurality of Bluetooth communications links, (b) Digital Enhanced Cordless Telecommunications (DECT) links, or (c) IEEE 802.11 (WiFi) links.

Other embodiments provide a system for managing audio communications in a mixed-user wireless audio environment including multiple wireless audio links communicating audio data between multiple wireless communications devices according to a wireless communications protocol (e.g., Bluetooth) having an available frequency spectrum, wherein the multiple wireless audio links include at least one voice link communicating voice data and at least one streaming audio link communicating streaming audio data. The system includes a central controller including a processor and memory. The processor may be configured to conduct the method of the preceding aspect, including any of the embodiments discussed herein. Thus, the processor may be configured to receive wireless link data including, for at least one wireless audio link, link usage data indicating whether the respective wireless audio link is a voice link or a streaming audio link; and further configured to generate or adjust channel assignment data based at least on the received wireless link data, wherein the channel assignment data designates (assigns) a set of voice channels in the available frequency spectrum to voice links for communicating voice data, and designates (assigns) a different set of streaming audio channels in the available frequency spectrum to streaming audio links for communicating streaming audio data. The processor may then communicate the channel assignment data to at least one of the wireless communication devices.

In some embodiments, the received wireless link data for each wireless audio link also includes link quality data indicating a quality of the respective wireless audio link, and the central controller processor is configured to generate or adjust the channel assignment data based at least on (a) the link usage data and (b) the link quality data. In some embodiments, the processor of the central controller is configured to identify link quality data associated with at least one voice link, compare the link quality data associated with at least one voice link with a target link quality metric associated with voice communications, and adjust an assignment of at least one frequency channel based on the comparison, to thereby adjust the set of voice channels assigned to voice communications.

Still other embodiments provide a system for managing audio communications communicated via a communications protocol (e.g., Bluetooth) using a defined frequency spectrum including a set of frequency channels. The system includes multiple base stations and a central controller communicatively coupled to the multiple base stations. The multiple base stations are configured for wireless communication of audio data with at least one corresponding client device to thereby define multiple wireless audio links for communicating audio data. The central controller communicatively includes a processor and memory. The processor may be configured to conduct the method of the preceding aspect, including any of the embodiments discussed herein. Thus, the processor may be configured to receive link usage data from at least a subset of the base stations, indicating whether each respective wireless audio link is a voice link carrying voice communications or a streaming audio link carrying streaming audio data, and generate or adjust channel assignment data based at least on the link usage data, the channel assignment data designating a set of voice channels in the available frequency spectrum for voice links, and designating a different set of streaming audio channels in the available frequency spectrum for streaming audio links. The processor may then communicate the channel assignment data to at least one base station. Each base station may then control, based on channel assignment data received from the central controller, one or more frequency channels used by the base station for audio communications with at least one corresponding client device.

In some embodiments, the processor may also receive link quality data from the base stations, indicating a quality of each respective wireless audio link, and generate or adjust the channel assignment data based at least on (a) the link usage data and (b) the link quality data received from the base stations.

Figure 2:
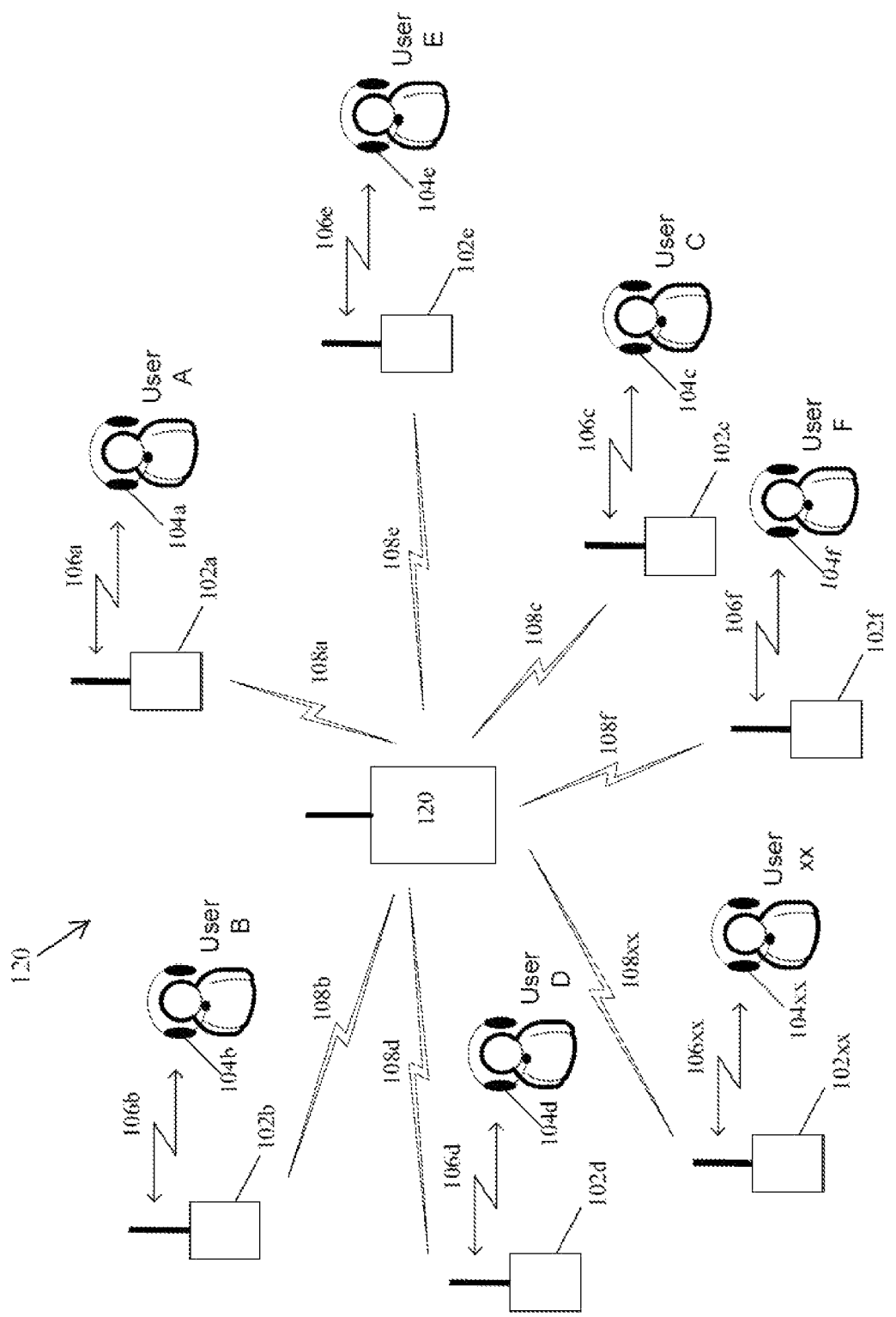
FIG. 2 illustrates a radio communication system with multiple base stations and client devices.

FIG. 2 illustrates a radio communication system with multiple base stations 102a, 102b, 102c, 102d, 102e, 102f . . . 102xx and client devices 104a, 104b, 104c, 104d, 104e, 104f . . . 104xx. There are respective wireless links 106a, 106b, 106c, 106d, 106e, 106f . . . 106xx between base stations 102a, 102b, 102c, 102d, 102e, 102f . . . 102xx and client devices 104a, 104b, 104c, 104d, 104e, 104f . . . 104xx. For example, wireless links 106a, 106b, 106c, 106d, 106e, 106f . . . 106xx are short-range wireless links and may, for example, be Bluetooth communications links, Digital Enhanced Cordless Telecommunications (DECT) links, or IEEE 802.11 (WiFi) links.

Central controller 120 is capable of wireless communications with base stations 102a, 102b, 102c, 102d, 102e, 102f . . . 102xx and client devices 104a, 104b, 104c, 104d, 104e, 104f . . . 104xx utilizing respective wireless links 108a, 108b, 108c, 108d, 108e, 108f . . . 108xx. In one embodiment, each client device conveys the relevant data to its base station which in turn forwards this to the central controller 120, together with the base station's own information. For example, wireless links 108a, 108b, 108c, 108d, 108e, 108f . . . 108xx are low-rate connections based on the Bluetooth Low-Energy Long-Range mode (peak rate of 125 kb/s but with a link budget 13 dB better than ordinary Bluetooth LE) that could cover the entire floor. Reporting intervals may be several minutes or longer. The dynamics are determined by the rate new calls are initiated and ongoing calls are released.

The radio communication system may, for example, be implemented in a telephone call center or an office environment having a high density of users. A base station 102a is configured to establish a wireless link 106a with a client device 104a (e.g., a wireless headset or other user wearable mobile device) used by User A. Base station 102a transmits data communications packets to and receives data communications packets from the client device 104a at User A over the wireless link 106a. In one example, the radio communication system is a Bluetooth system, where the base station 102a is a Bluetooth base station and the client device 104a is a Bluetooth headset. The wireless link 106a is a Bluetooth protocol connection. In a further example, the radio communication system is a DECT system, where the base station 102a is a DECT base station and the client device 104a is a DECT headset. As used herein the term "DECT" refers to devices operating according to the standard for Digital European Cordless Telecommunications, including the Digital Enhanced Cordless Telecommunications standard used in North America. The DECT links may operate in either the 1880-1900 MHz frequency band or the 1920-1930 MHz frequency band.

A second base station 102b from the plurality of base stations is configured to establish a second wireless link 106b with a second client device 104b used by a User B. The second base station 102b transmits data communications packets to and receives data communications packets from the second client device 104b over the second wireless link 106b. Base stations 102c, 102d, 102e, 102f . . . 102xx and client devices 104c, 104d, 104e, 104f . . . 104xx utilized by User C, User D, User E, User F, and User xx, respectively, operate in a similar manner utilizing wireless links 106c, 106d, 106e, 106f . . . 106xx, respectively.

A carrier frequency in a frequency band is used by a base station in radio contact with a client device. For example, a base station 102a transmits to a client device 104a in a transmit time slot in a first frame on a selected carrier frequency. The client device 104a transmits to the base station 102a in a receive time slot in a second frame on the same or different selected carrier frequency. Thus, during transmit time slots, base station 102a acts as a transmitter and during receive time slots base station 102a operates as a receiver. The first frame and the second frame taken together form a duplex frame.

In one example, the illustrated devices (e.g., Bluetooth devices) apply Adaptive Frequency Hopping (AFH). The adaptiveness comes from the fact that the master can decide to use (i.e., hop over) only a subset of carriers out of all carriers available. It is up to the manufacturers how to decide on the subset. The Bluetooth standard includes several commands at the Link Manager Protocol (LMP) level to enable AFH. AFH can be used dynamically to avoid certain static interferers like an WiFi access point. Base stations 102xx and/or client devices 104xx measure the power levels experienced on the carriers in the spectral band and may exclude certain carriers if interference on those carriers is deemed too high. The Bluetooth link will then hop around these carriers, thus avoiding carriers that may cause a lot of errors on the link. Yet, the central controller 120 may also use the AFH feature to optimize communications in the overall system. For example, if user E with device 104e is communicating with a premium customer, it may request at the central controller 120 for a high quality link Based on data measured in base station 102e, base station 102e may identify the nearest base stations and client devices that provide the most interference, being users A and C in this case (either by measurements based on distances E-A and E-C, or RSSI measurements on the channels 106a and 106c belonging to users A and C, respectively). Based on the request from user E, central controller 120 may instruct users A and C to use a set of carriers disjunct from the set of carriers allocated to user E, using the AFH feature. In this way, user E is not sharing the spectrum with its nearest neighbors and can therefore enjoy a higher quality link.

Base stations 102a, 102b, 102c, 102d, 102e, 102f . . . 102xx may, for example, be a landline or VOIP phone, access point (AP), personal computer, USB dongle, or mobile phone. Base stations 102a, 102b, 102c, 102d, 102e, 102f . . . 102xx are coupled to a telecommunications network. The network may be a communications network which may include a public switched telephone network (PSTN), a cellular network, an integrated services digital network (ISDN), a local area network (LAN), and/or a wireless local area network (WLAN), that support standards such as Ethernet, 802.11, and/or voice over internet protocol (VoIP).

Base stations 102a, 102b, 102c, 102d, 102e, 102f . . . 102xx include a transceiver and a processor configured to allow a wireless device (e.g., one of the client devices 104a, 104b, 104c, 104d, 104e, 104f . . . 104xx) access to a network connected to the base station (e.g., via a 10/100 Ethernet RJ-45 port). For example, the base station may be any device that allows wireless-equipped computers and other devices to communicate with a wired network. In one example, the base stations are able to support the 802.11a, 802.11b, and/or 802.11g wireless networking standards. In other examples, the base stations may be able to support other wireless networking standards.

The transmit power of base stations and/or client devices over wireless links 106a, 106b, 106c, 106d, 106e, 106f . . . 106xx is measured and monitored over time. The transmit power measurements can be monitored either at the client device or at the base station, or both. If measured and monitored at the base station, the client device can be configured to query the base station as to the transmit power. If measured and monitored at the client device, the base station can be configured to query the client device as to the transmit power.

Figure 3A:
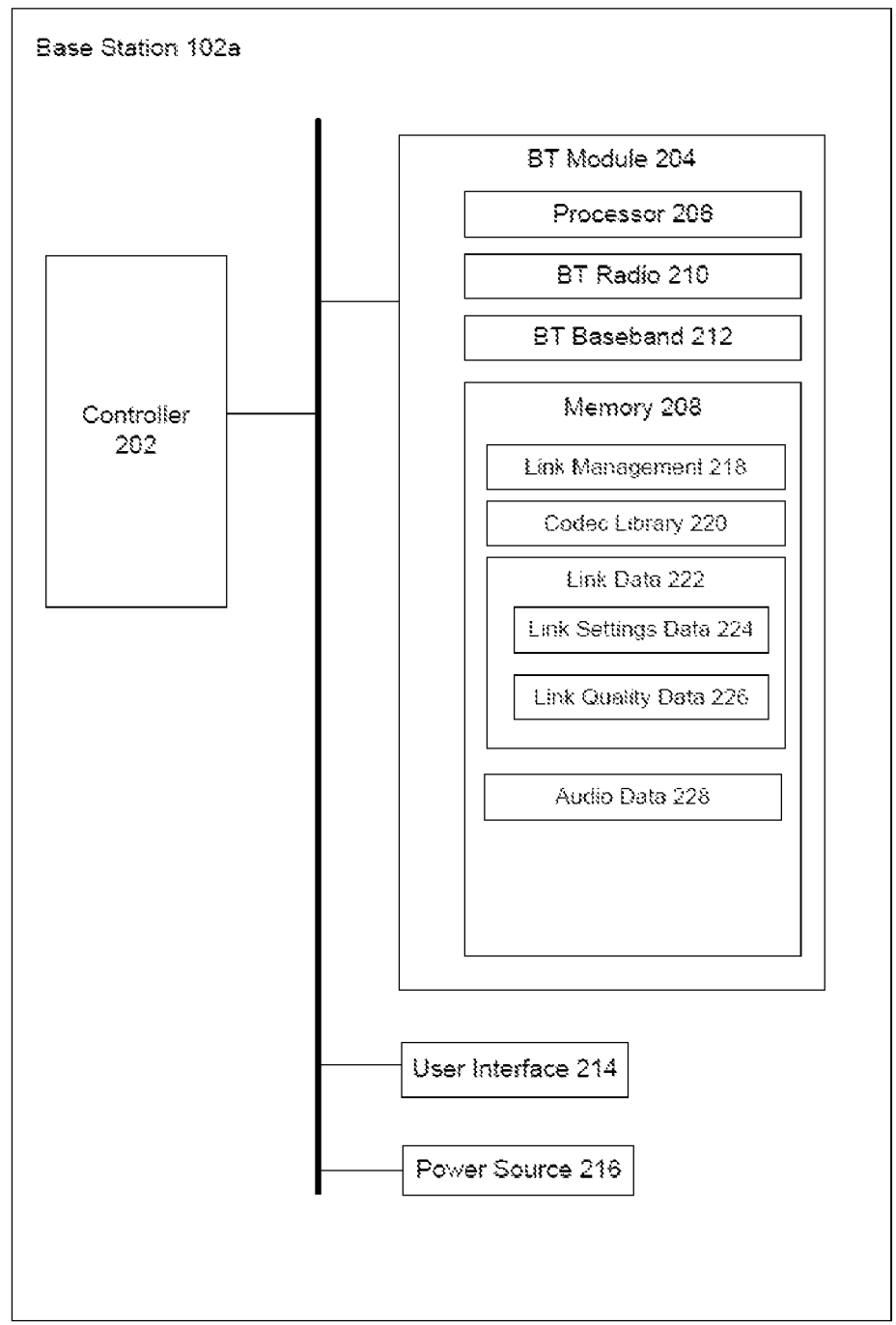
FIG. 3A illustrates a simplified block diagram of the base station shown in FIG. 2 in one example.

FIG. 3A illustrates a simplified block diagram of the base station 102a shown in FIG. 2 in one example. In a Bluetooth implementation, a base station 102a includes a controller 202, Bluetooth module 204, user interface 214, and power source 216. For example, base station 102a may be a mobile phone, headset, PDA, smartphone, portable computer, or other electronic device.

Bluetooth module 204 includes a processor 206, Bluetooth radio 210, and Bluetooth baseband 212. Bluetooth module 204 includes a memory 208 storing a link management application program 218, codec library 220 and link data 222. Link management application program 218 performs functions described herein or any other link related functions performed at base station 102a Link data 222, such as for link 106a, includes link settings data 224 and link quality data 226. Base station 102a may modify any of the link settings based on instructions received from the central controller 120.

For example, link settings data 224 may include (a) audio codec used, including rate (i.e. amount of compression), (b) packet type used, revealing modulation scheme, the Forward Error Correction (FEC) scheme, and the overhead (revealed by the packet length), (c) used transmit power, and (d) adaptive frequency hop parameters (i.e. over how many carriers the link hops). Link quality data 226 may include, for example, (a) RSSI value, (b) current carrier to interference (C/I) experienced, (c) data error rate (DER) values (e.g., bit error rate (BER), packet error rate (PER) and/or frame error rate (FER) values), and (d) audio quality data derived from analysis of the audio itself (e.g., audio data 228). The central controller 120 collects this data for each individual link Based on the performance (i.e., quality) data, it can then determine a distribution function to show the percentage of users with good and bad link performance.

Codec library 220 includes codecs available for selection and use by base station 102a. In a Bluetooth implementation, available codecs may include, for example: (a) CVSD (64 kb/s), (b) mSBC (64 kb/s), and (c) mSBC (128 kb/s). In a DECT implementation, available codecs may include, for example: (a) G726 (32 kb/s) and (b) G722 (64 kb/s). In a Bluetooth implementation, packet types include HV1-HV3, EV3-EV5, 2-EV3, 2-EV5, 3-EV3, and 3-EV5.

Processor 206 executes the programs stored in memory 208. Bluetooth radio 210 includes an antenna port (not shown), and may be implemented on a separate chip. Bluetooth radio 210 may include a Bluetooth compatible transmitter modulator and a Bluetooth compatible receiver modulator. Bluetooth radio 210 is configured to transmit or receive voice or data packets via an antenna. Bluetooth radio 210 may be a dual-mode radio communicating to the client device using the Bluetooth Classic standard and communicating to the central controller using the Bluetooth Low Energy (Long Range) standard.

Processor 206 may include a variety of processors (e.g., digital signal processors), with conventional CPUs being applicable. Memory 208 may include a variety of memories, and in one example includes RAM, ROM, flash memory, or a combination thereof. Memory 208 may further include separate memory structures or a single integrated memory structure. One or more components of Bluetooth module 204 may be integrated with components at base station 102a.

Figure 3B:
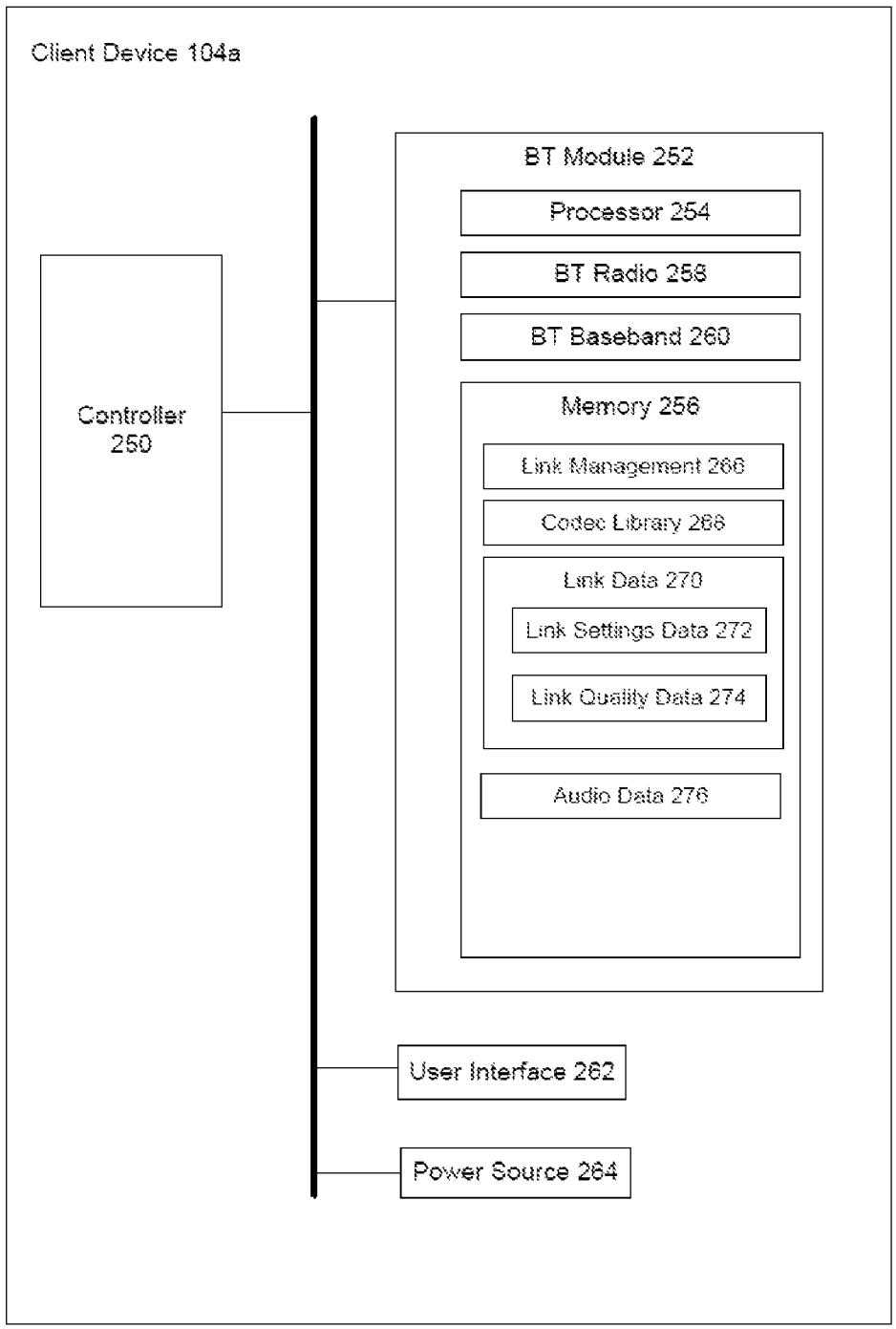
FIG. 3B illustrates a simplified block diagram of the client device shown in FIG. 2 in one example.

FIG. 3B illustrates a simplified block diagram of the client device 104a shown in FIG. 2 in one example. Bluetooth client device 104a includes a controller 250, Bluetooth module 252, user interface 262, and power source 264. Bluetooth module 252 includes a processor 254, Bluetooth radio 258, and Bluetooth baseband 260.

Bluetooth module 252 includes a memory 256 storing a link management application program 266, codec library 268, and link data 270. Codec library 268 is substantially similar to the codec library 220 described above. Link data 270 includes link settings data 272 and link quality data 274. For example, link settings data 272 may include (a) audio codec used, including rate (i.e. amount of compression), (b) packet type used, revealing modulation scheme, the Forward Error Correction (FEC) scheme, and the overhead (revealed by the packet length), (c) used transmit power, and (d) adaptive frequency hop parameters (i.e. over how many carriers the link hops). Link quality data 274 may include, for example, (a) RSSI value, (b) current carrier to interference (C/I) experienced, (c) data error rate (DER) values (e.g., bit error rate (BER), packet error rate (PER) and/or frame error rate (FER) values), and (d) audio quality data derived from analysis of the audio itself (e.g., audio data 276). The central controller 120 collects this data from each individual link.

Processor 254 executes programs stored in memory 256. Bluetooth radio 258 includes components and operates similar to Bluetooth radio 210 described above. For example, client device 104a may be a mobile phone, headset, PDA, smartphone, portable computer, or other electronic device. Link management application program 266 is capable of performing all of the functions performed by link management application program 218 or any other link related functions performed at client device 104a.

Figure 4:
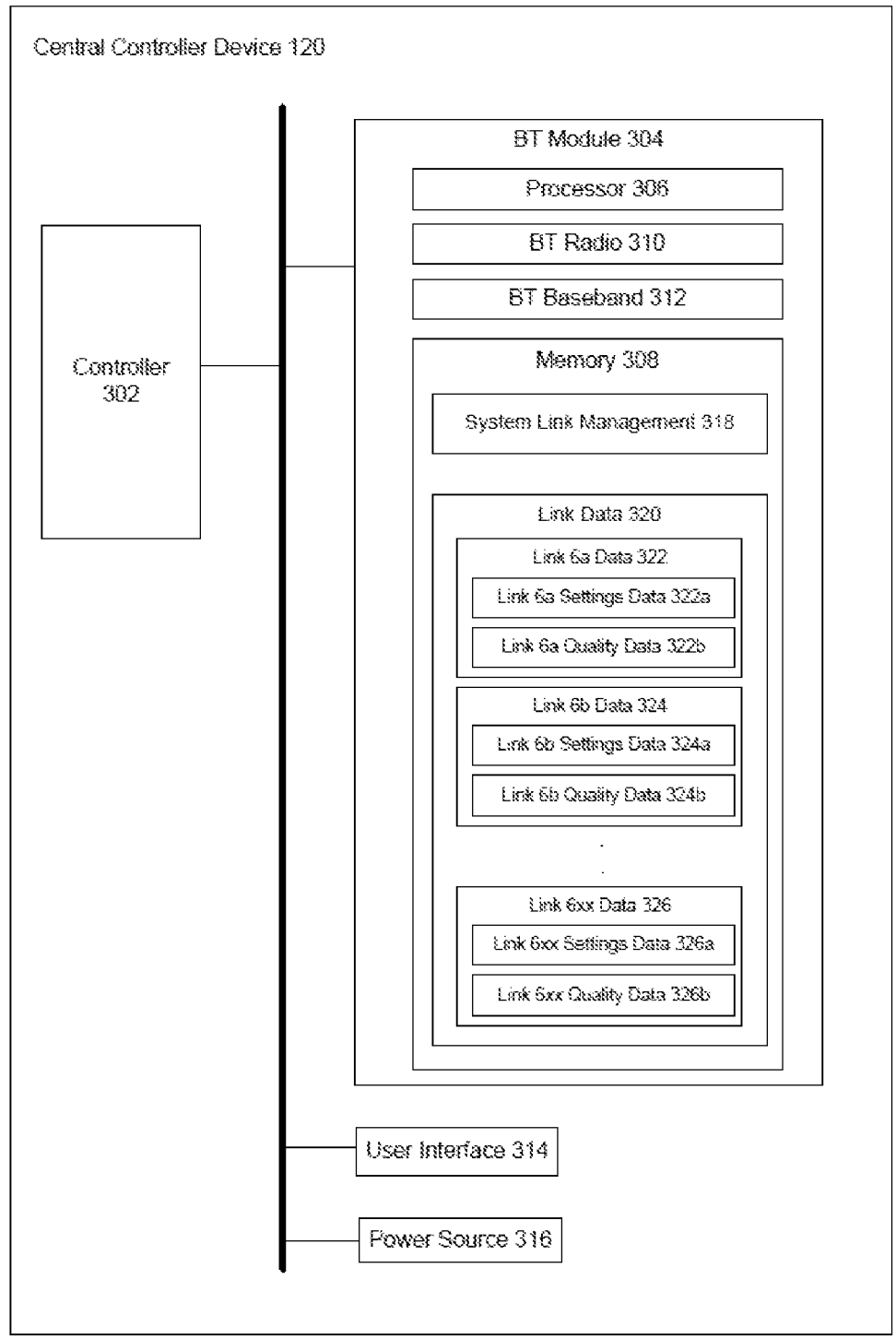
FIG. 4 illustrates a simplified block diagram of the central controller shown in FIG. 1 in one example.

FIG. 4 illustrates a simplified block diagram of the central controller 120 shown in FIG. 2 in one example. In a Bluetooth implementation, central controller 120 includes a controller 302, Bluetooth module 304, user interface 314, and power source 316. For example, central controller 120 may be a server, personal computer, or other electronic device.

Bluetooth module 304 includes a processor 306, Bluetooth radio 310, and Bluetooth baseband 312. Bluetooth module 304 also includes a memory 308. Memory 308 stores a system link management application program 318 interfacing with link management application 218 and/or link management application 266. Memory 308 further stores link data 320 received from base stations and/or client devices associated with the wireless links between the base stations and the client devices. Link data 320 includes, for example, link 106a data 322 Link 106a data 322 includes link 106a settings data 322a and link 106a quality data 322b. Link data 320 includes, for example, link 106b data 324 Link 106b data 324 includes link 106b settings data 324a and link 106b quality data 324b. Link data 320 includes all received link data, i.e., up to and including link 106xx data 326, which includes link 106xx settings data 326a and link 106xx quality data 326b. As used herein, the term link settings data includes, but is not limited to settings associated with an audio codec, a data packet type, a modulation scheme, a used transmit power, or an adaptive frequency hop parameter. Similarly, the term link quality data includes, but is not limited to a received signal strength indicator (RSSI) data, data error rate (DER) data (e.g., bit error rate (BER), packet error rate (PER) and/or frame error rate (FER) values), and/or carrier-to-interference (C/I) data.

Processor 306 executes programs stored in memory 308, including system link management application program 318. Bluetooth radio 310 includes an antenna port (not shown), and may be implemented on a separate chip. Bluetooth radio 310 may include a Bluetooth compatible transmitter modulator and a Bluetooth compatible receiver modulator. Bluetooth radio 310 may support the Bluetooth Classic standard or the Bluetooth Low Energy standard, or both. Bluetooth radio 310 is configured to transmit or receive voice or data packets via an antenna.

Processor 306 may include a variety of processors (e.g., digital signal processors), with conventional CPUs or GPUs being applicable. Memory 308 may include a variety of memories, and in one example includes RAM, ROM, flash memory, or a combination thereof. Memory 308 may further include separate memory structures or a single integrated memory structure. One or more components of Bluetooth module 304 may be integrated with components at Bluetooth central controller 120.

Referring to FIGS. 2, 3A, 3B, and 4, in one example operation, the system link management application program 318 is configured to receive link data 320 associated with wireless links 106a, 106b, 106c, 106d, 106e, 106f . . . 106xx between base stations 102a, 102b, 102c, 102d, 102e, 102f . . . 102xx and client devices 104a, 104b, 104c, 104d, 104e, 104f . . . 104xx, respectively. For example, base station link management application program 218 at the base station 102a is configured to transmit a first wireless link 106a data 322 to the central controller 120. The first wireless link 106a data 322 is associated with a first wireless link 106a between the base station 102a and the client device 4a. The first wireless link 106a data 322 is included in link data 320 received at the central controller 120.

System link management application program 318 identifies a global system performance from link data 320 utilizing a link quality parameter. For example, the link quality parameter is a packet error rate, bit error rate, carrier-to-interference (C/I) ratio, or received signal strength indicator (RSSI). In a further example, the link quality parameter is any audio quality parameter determined from analysis of the actual transmitted audio. For example, Perceptual Evaluation of Speech Quality (PESQ) or Perceptual Objective Listening Quality Analysis (POLQA) may be used.

In one example, to identify the global system performance, system link management application program 318 generates a cumulative distribution function of wireless links 106a, 106b, 106c, 106d, 106e, 106f . . . 106xx with respect to the link quality parameter. System link management application program 318 then identifies a percentage of wireless links 106a, 106b, 106c, 106d, 106e, 106f . . . 106xx having an acceptable or good link quality. To identify the percentage of wireless links 106a, 106b, 106c, 106d, 106e, 106f . . . 106xx having the acceptable or good link quality, system link management application program 318 determines the percentage of wireless links 106a, 106b, 106c, 106d, 106e, 106f . . . 106xx having a value of the link quality parameter less than a predetermined threshold value. For example, where the link quality parameter is the data error rate (DER), a threshold value of 1% may be used, below which is considered a good link quality. A threshold value of 0.1% may be used, below which is considered a very good link quality.

Alternatively or in addition, system link management application program 318 identifies a percentage of wireless links 106a, 106b, 106c, 106d, 106e, 106f . . . 106xx having an unacceptable link quality. To identify the percentage of wireless links 106a, 106b, 106c, 106d, 106e, 106f . . . 106xx having the unacceptable link quality, system link management application program 318 determines the percentage of wireless links 106a, 106b, 106c, 106d, 106e, 106f . . . 106xx having a value of the link quality parameter greater than a predetermined threshold value. For example, where the link quality parameter is the packet error rate, a threshold value of 7% may be used, above which is considered an unacceptable poor link quality.

Responsive to the global system performance, system link management application program 318 generates one or more modified link settings for one or more wireless links in wireless links 106a, 106b, 106c, 106d, 106e, 106f . . . 106xx. For example, one or more modified link settings for the wireless link 106a between base station 102a and client device 104a is generated. The one or more modified link settings may be for a forward link from the base station 102a to the client device 104a, a reverse link from the client device 104a to the base station 102a, or for both the forward and reverse link.

In one usage scenario, system link management application program 318 identifies a system having both good links and unacceptable links. In this example scenario, wireless link 106a is identified as a good or acceptable link and wireless link 106b is identified as an unacceptable link. To generate the modified wireless link 106a settings, system link management application program 318 identifies a good or acceptable link quality status of the wireless link 106a and selects a new link setting resulting in a shortened packet length for packets transmitted between the base station 102a and the client device 104a. For example, the new link setting may utilize a higher rate modulation scheme with reduced coding in order to increase channel capacity availability. In contrast, to generate the modified wireless link 106b settings, system link management application program 318 identifies an unacceptable link quality status of the wireless link 106b and selects a new link setting resulting in a lengthened packet length for packets transmitted between the base station 102b and the client device 104b. For example, the new link setting may utilize packet types with less complex modulation, more forward error correction (FEC), possibly lower codec rates in order to increase robustness on the link.

The system link management application program 318 transmits to selected base stations 102a, 102b, 102c, 102d, 102e, 102f . . . 102xx or client devices 104a, 104b, 104c, 104d, 104e, 104f . . . 104xx the one or more modified link settings for the selected wireless links 106a, 106b, 106c, 106d, 106e, 106f . . . 106xx for implementation. The base station link management application program 218 receives from the central controller 120 one or more modified link settings for the first wireless link 106a between the base station 102a and the client device 104a. The base station link management application program 218 implements the one or more modified link settings at the base station 102. The base station link management application program 218 transmits a data between the base station 102a and the client device 104a over the first wireless link 106a utilizing the one or more modified link settings.

During continued operation, system link management application program 318 at the central controller 120 is further configured to receive a subsequent first wireless link 106a data 322 associated with the first wireless link 106a between the base station 102a and the client device 104a. This subsequent first wireless link 106a data 322 is received following implementing the one or more modified link settings for the first wireless link 106a at the base station 102. The system link management application program 318 identifies a changed global system performance utilizing the link quality parameter utilizing the subsequent first wireless link 106a data 322. For example, the changed global system performance comprises an improved system performance.

Figure 5:
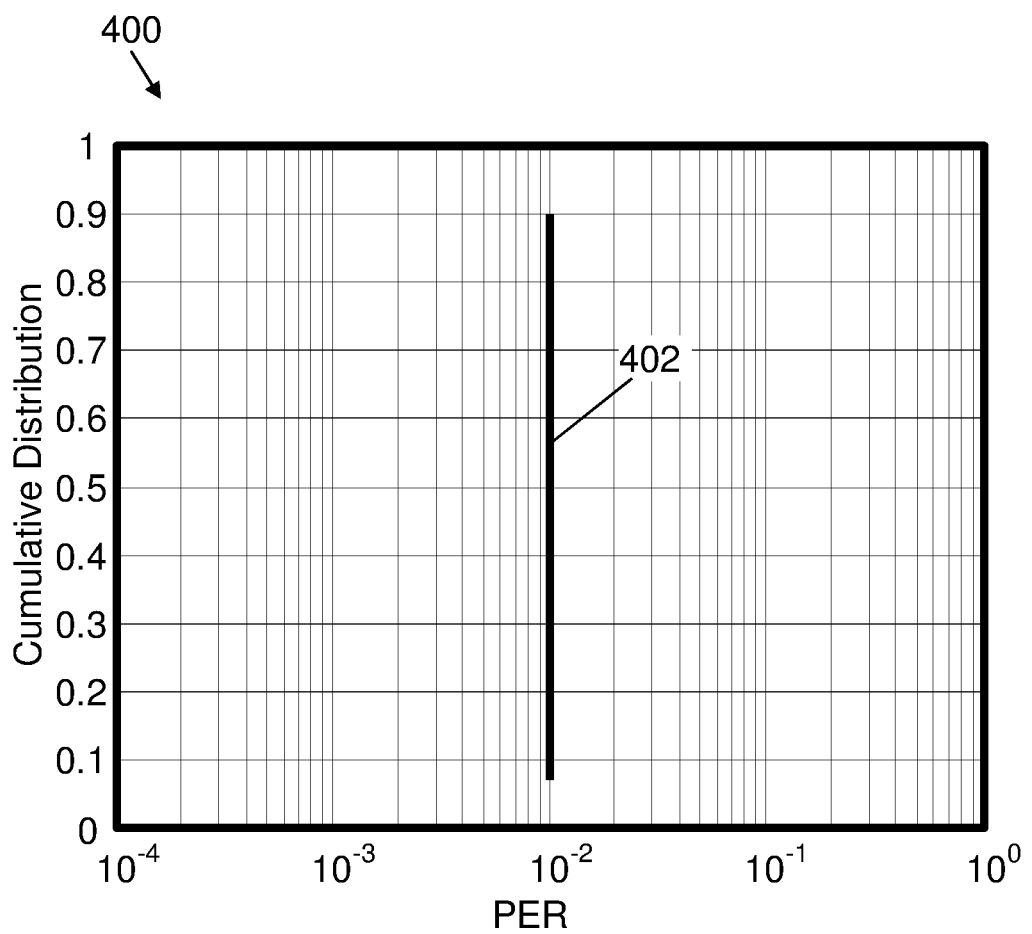
FIG. 5 is a graph of a cumulative distribution function curve generated by system link management application program in one example.

FIG. 5 is a graph 400 of an idealized cumulative distribution function curve 402 generated by system link management application program 318 in one example. For example, system link management application program 318 may set as a desired system performance parameter that all users have a data error rate (DER) of 1%. This ideal cumulative distribution function (CDF) is shown in FIG. 5. In this example case, the distribution function curve 402 shows that all users have good link performance (i.e., satisfy the desired system performance that every link has a PER of 1%).

Figure 6:
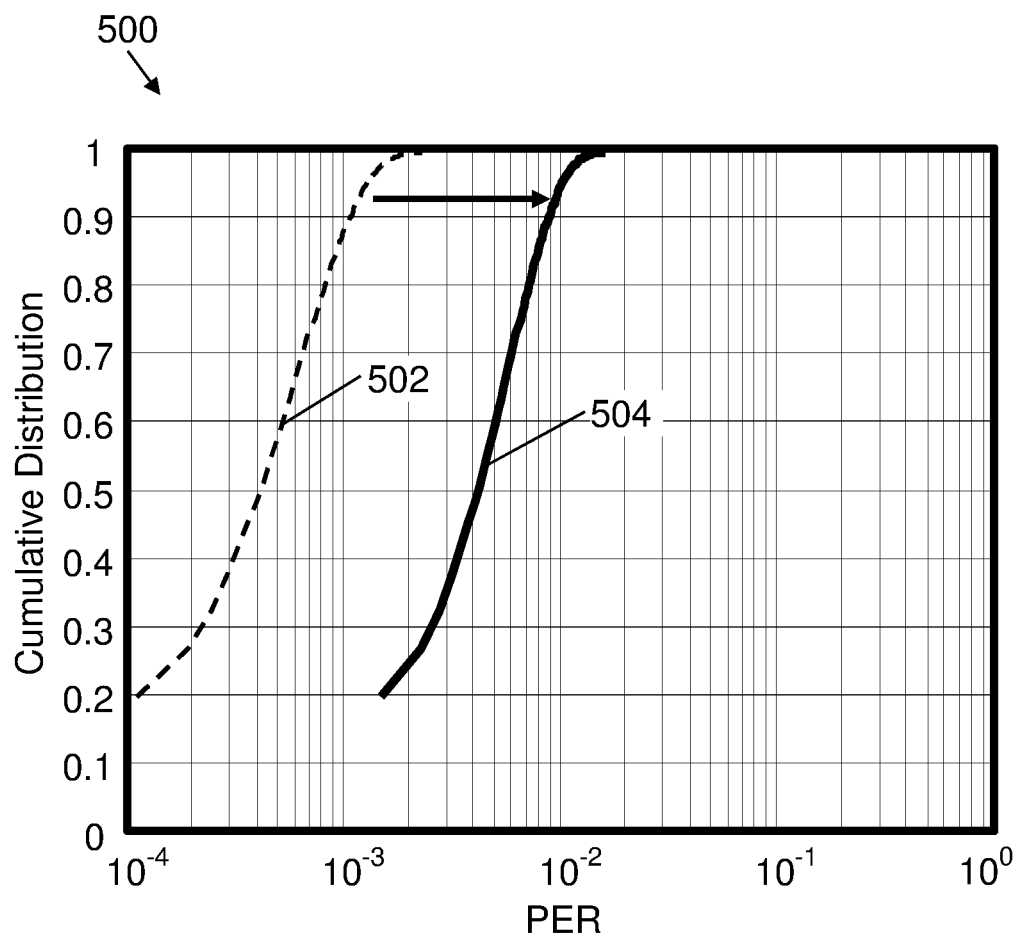
FIG. 6 is a graph of a first distribution function curve and a subsequent second distribution function curve in a further example.

FIG. 6 is a graph 500 of a distribution function curve 502 and a distribution function curve 504 in a further example. Distribution function curve 502 illustrates system performance prior to transmission by system link management application program 318 of modified link parameter settings (i.e., link parameter updates) to one or more of base stations 102a, 102b, 102c, 102d, 102e, 102f . . . 102xx and/or client devices 104a, 104b, 104c, 104d, 104e, 104f . . . 104xx for implementation. Distribution function curve 504 illustrates system performance after implementation of these modified link settings. Both distribution function curve 502 and distribution function curve 504 indicates overall good performance.

Distribution function curve 502 shows that the overall performance of the links is very good: more than 90% have a DER of 0.1% or less. The low interference conditions can be traded off for higher audio quality. For example, the central controller 120 can tell the units with very good link quality (e.g., 0.1% DER or less), to use a higher rate codec (i.e., less compression), thus providing a higher audio quality. This may increase the traffic load in the system (and thus the mutual interference). To support the higher data rates, packet types can be selected with a more complex modulation scheme (sending more bits per symbol, like moving from BPSK to 8-PSK), and/or have less FEC. This will make the high-quality links more susceptible to interference leading to higher packet errors. When the new parameters have set into effect, the CDF will have moved up like distribution function curve 504 which is closer to the ideal shown in FIG. 5. The benefit is that most, if not all, users have a higher audio quality, while the DER is still acceptable.

Figure 7:
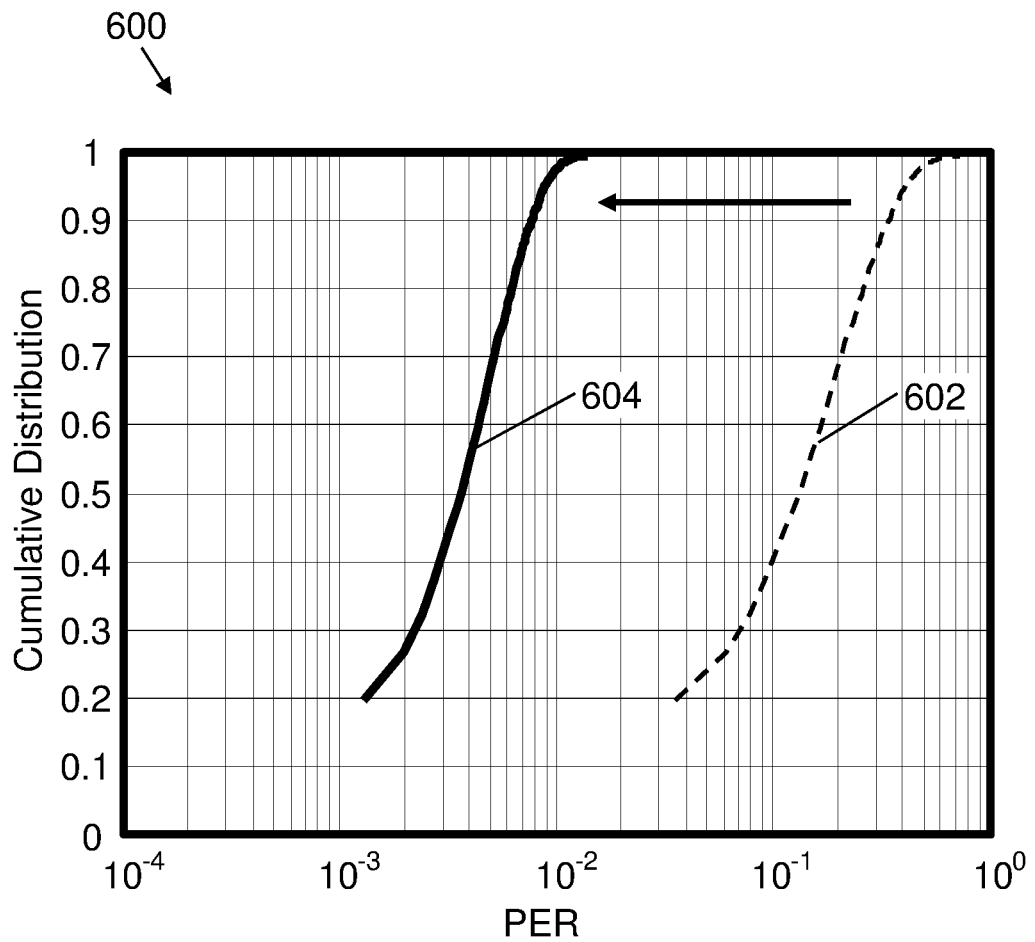
FIG. 7 is a graph of a first distribution function curve and a subsequent second distribution function curve in a further example usage.

FIG. 7 is a graph 600 of a distribution function curve 602 and a distribution function curve 604 in a further example usage. Distribution function curve 602 illustrates system performance prior to transmission by system link management application program 318 of modified link parameter settings (i.e., link parameter updates) to one or more of base stations 102a, 102b, 102c, 102d, 102e, 102f . . . 102xx and/or client devices 104a, 104b, 104c, 104d, 104e, 104f . . . 104xx for implementation.

Distribution function 602 indicates the links all have a bad performance. In this case, the central controller 120 takes actions opposite of the ones applied for FIG. 6. More interference resilient packet types must be used, like less complex and more robust modulation, more FEC support, shorter packets (resulting in more overhead though). This may lead to the use of lower rate codecs with less inherent audio quality (note that the audio quality perceived depends on the audio compression (assumed lossy) and the errors). Users with the worst performance (upper right corner in distribution function curve 602) are handled by the central controller 120 first, and get the most intense corrections for the link parameters. When the new parameters have set into effect, the result will be distribution function curve 604. The benefit is that most users now have good performance.

Figure 8:
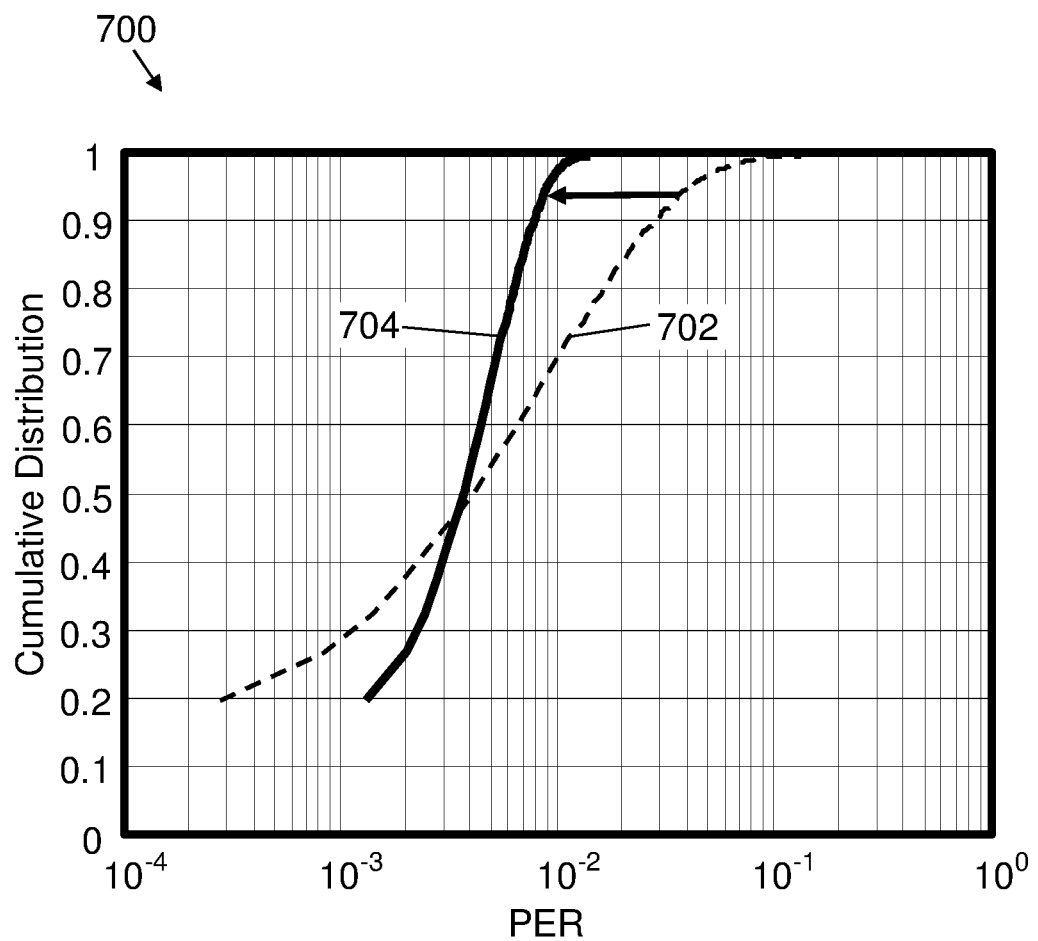
FIG. 8 is a graph of a first distribution function curve and a subsequent second distribution function curve in a further example.

FIG. 8 is a graph 700 of a distribution function curve 702 and a distribution function curve 704 in a further example. Distribution function curve 702 illustrates system performance prior to transmission by system link management application program 318 of modified link parameter settings (i.e., link parameter updates) to one or more of base stations 102a, 102b, 102c, 102d, 102e, 102f . . . 102xx and/or client devices 104a, 104b, 104c, 104d, 104e, 104f . . . 104xx for implementation.

Distribution function curve 702 indicates there is mixed performance in the system whereby there are both a large number of very good links, but also many very bad links. The distribution function curve 702 is less steep relative to prior described examples. In distribution function curve 702, 30% of the links has a DER of more than 1%. At the same time, another 30% has a DER better than 0.1%. The central controller 120 can send link updates to the very good-link users to create bandwidth (and reduce interference) that will help the bad-link users. For example, the good-link users are ordered to use short packets, i.e. using more complex modulation schemes and without FEC. Or good-link users can be ordered to use audio codecs with lower rate audio codecs (more compression) to free up bandwidth. They can also be instructed to use a lower transmit power, thus producing less interference. Adaptive Tx power control is applied in Bluetooth, but individual in each link based on the RSSI. This type of adaptive power control is distributed control applied locally in each link separately. In contrast, the central controller 120 may control the Tx power based on global information, the cumulative distribution function. To further improve the distribution curve 702, bad-link users are instructed to improve their robustness, using packet types with less complex modulation, more FEC, possibly requiring lower codec rates. The link parameters provided by the central controller 120 can be valid for both the forward link (downlink from base to headset) and reverse link (uplink from headset to base) together. In one example, an asymmetric link that is optimized for the environment each receiver is in is utilized. When the new parameters have set into effect, the result will be distribution function curve 704. The benefit is that most users now have good performance. For example, in the new distribution curve 704, the percentage of dissatisfied users (i.e. users with a DER of 1% or more) has reduced from 30% to 3%.

Figure 9:
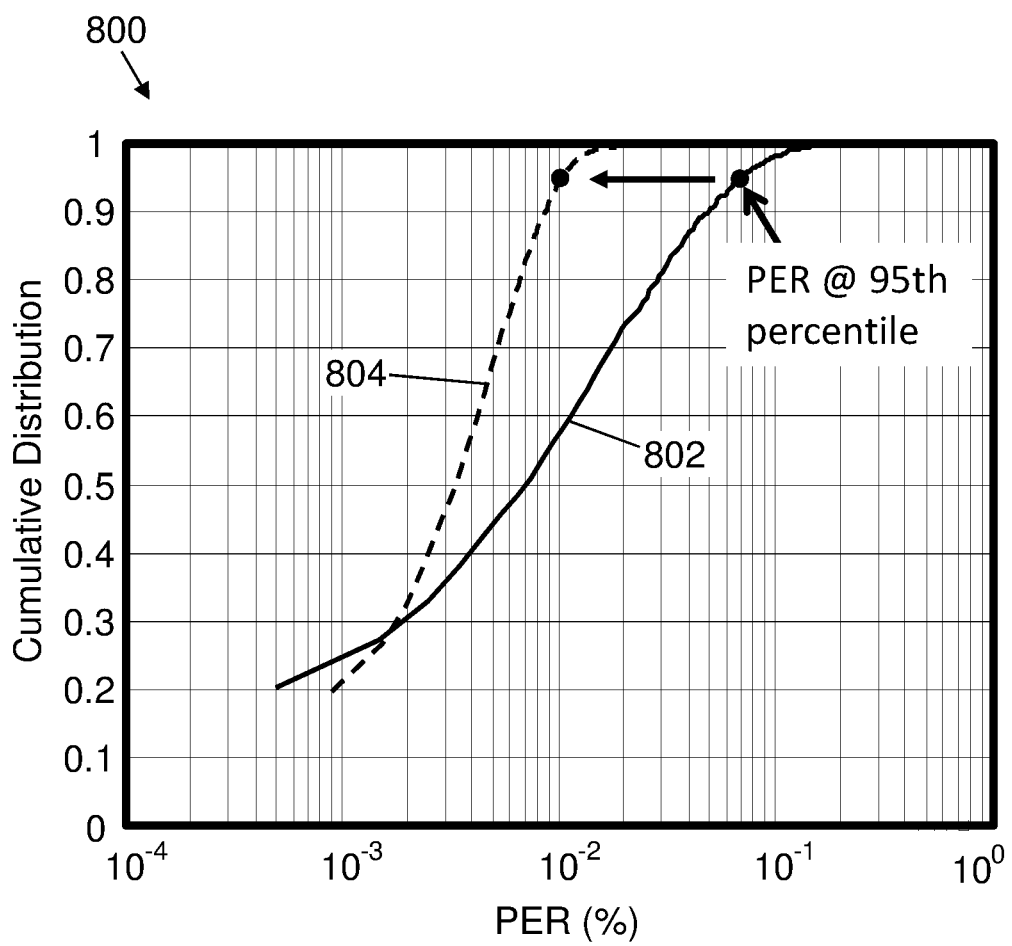
FIG. 9 is a graph of a first distribution function curve and a subsequent second distribution function curve in a further example.

FIG. 9 is a graph 800 of a distribution function curve 802 and a distribution function curve 804 in a further example. Distribution function curve 802 illustrates system performance prior to transmission by system link management application program 318 of modified link parameter settings (i.e., link parameter updates) to one or more of base stations 102a, 102b, 102c, 102d, 102e, 102f . . . 102xx and/or client devices 104a, 104b, 104c, 104d, 104e, 104f . . . 104xx for implementation.

Distribution function curve 802 indicates there is mixed performance in the system. Distribution function curve 802 is the result of the data gathered in the central controller 120 showing the distribution of DER over the different (local) links between client devices and base stations. At the 95-percentile, a DER of 7% is observed, meaning that 5% of the users have a DER of 7% or higher. This could be considered too high. The central controller 120 then examines the collective data provided by the client devices and base stations. For example, it could identify which client devices are very close to their base stations and experience a very high RSSI (and good quality link so a DER far below 1%). For these client devices, the central controller 120 may advise to use a very high-rate modulation scheme with little coding, resulting in very short packets. As a result, capacity is freed up and interference is reduced which will benefit the users that experience a DER of 7%. As an option, the central controller 120 may advise client devices with poor performance (7% DER of more) to use a more robust link type that can withstand more interference and a voice codec that is more robust to interference. The central controller 120 may thus send new configuration data to each headset and base station, which will impact the statistics in such a way that more users have an acceptable performance, resulting in distribution function curve 804. Apart from a shift, it is noticed that the distribution function curve 804 may also be steeper, meaning that there are less users with over-qualified performance (like a DER below 0.01%). Thus the available capacity is better divided over all users.

In general, users with very good performance are advised by the central controller 120 to use settings that require less channel capacity but which may result in slightly higher DER (or higher latency or lower quality voice). In contrast, users with bad performance are advised by the central controller 120 to use settings that make the link more robust, even if a little more channel capacity is needed.

When there are too many users in the shared space to reach acceptable performance for everybody, the central controller 120 may decide to deny service to one or more client devices (apparently, the system is overloaded). Conversely, when the number of active users low, the central controller 120 may advise the client devices (and/or bases) to use settings that use a large channel capacity and provide high quality (e.g. wideband) voice.

The algorithm residing in the central controller for setting the link parameters is adaptive and iterative. As the link parameters are changed, new distribution functions can be formed by the new measurements provided to the central controller. Also the number of active users may change over time. Base stations 102xx and/or headsets 104xx continuously determine the DER during active links (for example over a time period of 5 seconds) and report that to the central controller 120. The central controller 120 collects the DER data over a period of say 5 minutes, bins the data, and derives distribution functions. Based on the distribution functions, link parameters in the base stations 102xx and headsets 104xx may be changed, resulting in new DER data. Again, this DER data (collected over a period of 5 minutes) is binned by the central controller and new distribution functions are derived. This may lead to new link parameter settings. The system will also adapt to changes in the environment, like when additional base stations 102xx are placed or base stations 102xx are moved, and to the traffic intensity, i.e. when more or less users become active, or when more alternative traffic is generated (like WiFi, or other technologies reusing the same radio spectrum).

In all previous examples, client device 104xx may not have a direct wireless link to the central controller 120, but will use the associated base station 102xx as a relay. That is, link data present in the client device 104xx is sent to base station 102xx which in turn forwards this data to central controller 120. Likewise, client device 104xx link settings as ordered by the central controller are sent to base station 102xx which in turn forwards these link setting to client device 104xx.

In various embodiments, the techniques of FIG. 10 discussed below may be implemented as sequences of instructions executed by one or more electronic systems. For example, one or more electronic systems as shown in FIGS. 2, 3A-3B, and 4 are utilized.

Figure 10:
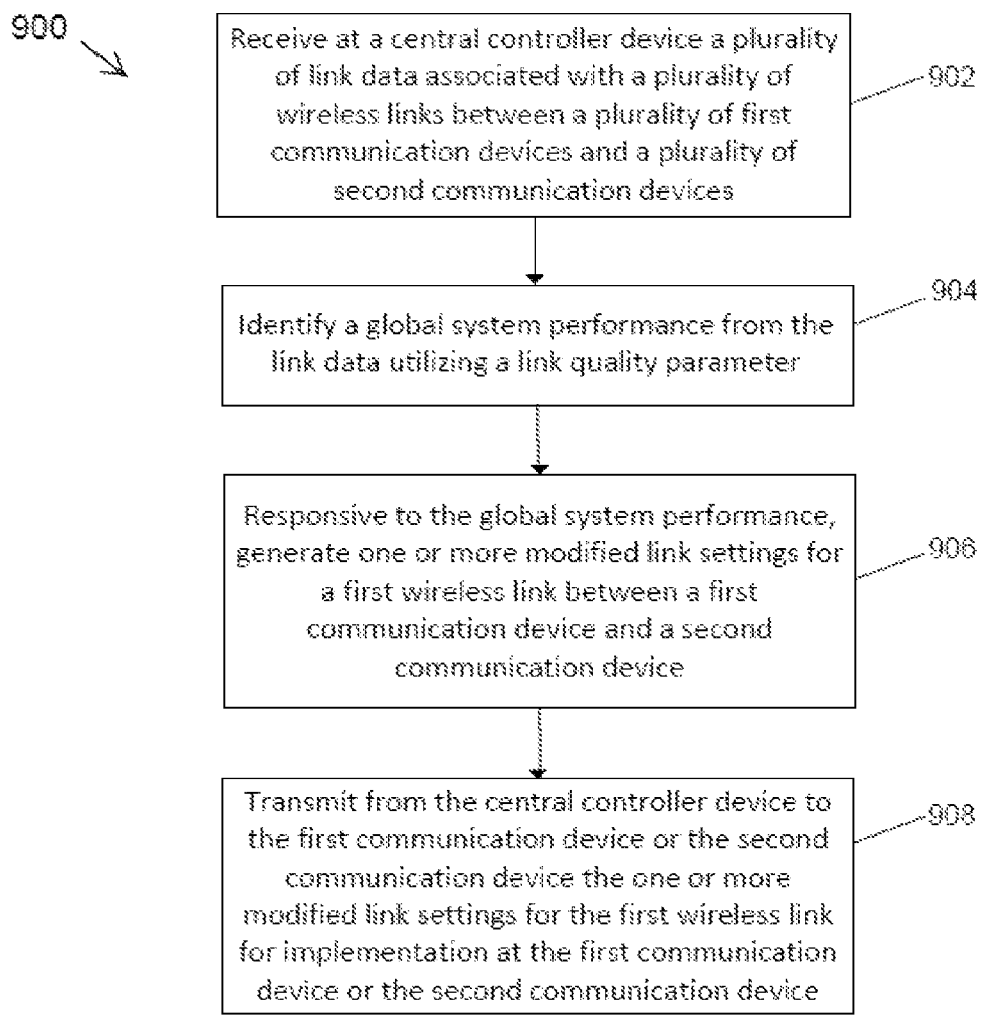
FIG. 10 is a flow diagram illustrating wireless link management using a central controller in one example.

FIG. 10 is a flow diagram illustrating wireless link management using a central controller in one example. At block 902, a plurality of link data associated with a plurality of wireless links between a plurality of first communication devices (e.g., base stations) and a plurality of second communication devices (e.g., client devices, such as wireless headsets) is received at a central controller. In one example, the plurality of link data includes a link settings data associated with a link parameter and a link quality data associated with the link quality parameter. For example, the link settings data includes settings associated with an audio codec, a data packet type, a modulation scheme, a used transmit power, or an adaptive frequency hop parameter. For example, the link quality data includes a received signal strength indicator (RSSI) data, data error rate (DER) data (e.g., bit error rate (BER), packet error rate (PER) and/or frame error rate (FER) values), or a carrier-to-interference (C/I) data. In one example, the plurality of wireless links are short-range wireless links and may be a plurality of Bluetooth communications links, Digital Enhanced Cordless Telecommunications (DECT) links, or IEEE 802.11 (WiFi) links.

At block 904, a global system performance is identified from the plurality of link data utilizing a link quality parameter, such as a packet error rate or bit error rate. In one example, identifying the global system performance from the plurality of link data utilizing the link quality parameter includes generating a distribution function of the plurality of wireless links with respect to the link quality parameter. A percentage of the plurality of wireless links having an acceptable or good link quality is identified or a percentage of the plurality of wireless links having an unacceptable link quality is identified. Identifying the percentage of the plurality of wireless links having the acceptable or good link quality may include determining the percentage of the plurality of wireless links having a value of the link quality parameter less than a threshold value. Identifying the percentage of the plurality of wireless links having an unacceptable link quality may include determining the percentage of the plurality of wireless links having a value of the link quality parameter greater than the threshold value.

At block 906, responsive to the global system performance, one or more modified link settings are generated for a first wireless link between a base station and a client device. The base station is selected from the plurality of base stations, and the client device is selected from the plurality of client devices.

In one example, generating one or more modified link settings for the first wireless link between the base station and the client device includes identifying a good or acceptable link quality status of the first wireless link. A new link setting is selected resulting in a shortened packet length for packets transmitted between the base station and the client device. In one example, generating one or more modified link settings for the first wireless link between the base station and the client device includes identifying an unacceptable link quality status of the first wireless link. A new link setting is selected resulting in a lengthened packet length for packets transmitted between the base station and the client device.

At block 908, the one or more modified link settings for the first wireless link are transmitted from the central controller to the base station or the client device for implementation. The one or more modified link settings are then implemented at the base station or the client device.

In one example, the method further includes receiving at the central controller a subsequent first wireless link data associated with the first wireless link between the base station and the client device, the subsequent first wireless link data received following implementing the one or more modified link settings for the first wireless link at the base station or the client device. A changed global system performance is identified utilizing the link quality parameter utilizing the subsequent first wireless link data. For example, the changed global system performance is an improved system performance.

In one example, the method further includes generating one or more modified link settings for a selected two or more wireless links selected from the plurality of wireless links responsive to identifying the global system performance. The one or more modified link settings for the selected two or more wireless links are transmitted from the central controller for implementation at two or more base stations or two or more client devices.

Managing an Environment with Both Voice Users and Streaming Audio Users

As discussed above, some wireless communication systems or environments may include both voice users and streaming audio users using a shared wireless communication protocol. For example, a call center or other enterprise environment may include multiple wireless users (e.g., call center agents wearing wireless Bluetooth headsets) linked to multiple base stations to define multiple audio communication links within the environment. At any given time, each wireless user (e.g., call center agent) may be engaged in a voice-based phone call via a corresponding base station, or if not in a phone call, may stream audio (e.g., music) via the corresponding base station, or may be idle. In other words, when a user is not engaged in a phone call, they may be listening to music or watching a video using their wireless Bluetooth headset.

As used herein, a headset user engaged in a voice-based call or voice data communications between the user's headset and a base station and is referred to as a "voice user," while a headset user receiving streaming audio data communicated from a base station to the user's headset, e.g., via a defined audio streaming protocol, is referred to as a "streaming audio user." A streaming audio user receiving streaming music (one example type of streaming audio data) at their headset is referred to as a "music user."

Voice data may be communicated via any suitable voice communication protocol. In some embodiment, voice data is communicated via a bi-directional synchronous fixed-interval protocol, such as the Bluetooth eSCO protocol, for example.

Streaming audio data may include any live or pre-recorded data (e.g., music, a talk radio stream, a podcast, movie audio, or any other type of audio data) communicated in any suitable type of codec or file type (e.g., MP3, AAC, or ATRAC files, for example) and via any suitable audio streaming protocol (e.g., Bluetooth A2DP or aptX, for example).

Conventional analysis and attempts to improve user density in call centers and other enterprise environments have focused on voice communications. However, the inventor has discovered that such conventional analysis fails to effectively account for modern environments, e.g., call centers, that include a mix of voice users and streaming audio users (e.g., music users) sharing the same frequency spectrum at any given time.

First, conventional analysis typically fails to account for the difference in the acceptable data error rate (DER), e.g., frame error rate (FER), for voice versus streaming audio communications. Voice communications are relatively robust and an acceptable quality (expressed in Mean Opinion Score, or MOS) may be achieved at Frame Error Rates (FER) of 1% or lower, for example. In contrast, audio streaming (e.g., music streaming) typically requires a lower FER for an acceptable listening experience, for example, 0.1% or lower.

Second, conventional analysis typically fails to consider or account for the different interference effects resulting from different types of audio transmissions interfering with each other. For example, in an environment including a mix of voice users and streaming audio (e.g., music) users sharing the same physical space and the same wireless frequency spectrum, there will be mutual interference among voice users themselves, among streaming audio users themselves, and also between voice users and streaming audio users. As discussed below (e.g., with reference to FIGS. 12A and 12B), the inventor has discovered that at least in certain scenarios, interference effects caused by wireless (e.g., Bluetooth) voice communications are significantly larger than interference effects caused by streaming audio communications—both on other voice communications and on streaming audio (e.g., music) communications. As discussed below, embodiments of the present invention may address these interference impacts, e.g., by selective assignment of wireless frequency channels to separate voice communications from streaming audio (e.g., music) communications.

Figure 11A:
FIGS. 11A-11C show known timing diagrams for three types of Bluetooth audio communications.
Figure 11B:
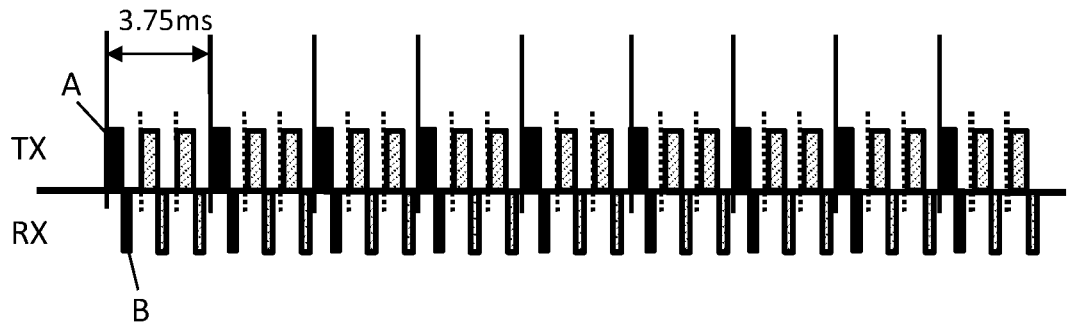
Figure 11C:
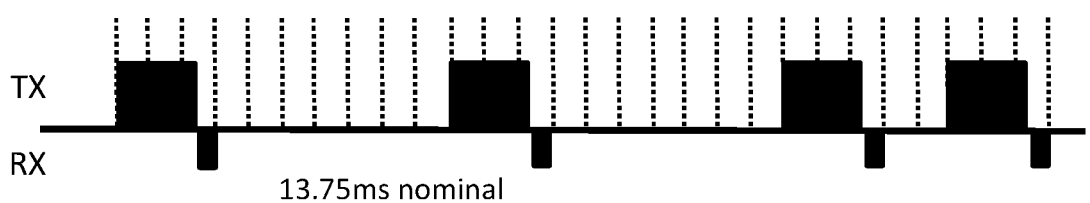

FIGS. 11A-11C show known timing diagrams for three types of Bluetooth audio communications. In particular, FIG. 11A is a timing diagram for mono voice data communications (mono voice link); FIG. 11B is a timing diagram for stereo voice communications (stereo voice link); and FIG. 11C is a timing diagram for streaming music according to the streaming A2DP Bluetooth standard.

As shown in FIG. 11A, a mono voice link (eSCO) includes a voice packet transmission A from a master device to a slave device (e.g., from a base station to a wireless headset), followed by a voice packet transmission B from the slave device to the master device. Packets A and B are sent on the same carrier frequency. These two voice packet transmissions A and B are followed by two optional retransmit possibilities C, which are sent on different carrier frequencies. This pattern is repeated every 7.5 ms (although on different carrier frequencies).

As shown in FIG. 11B, a stereo voice link (eSCO) is similar to the mono voice link, but the interval is shorter (3.75 ms). Further, the voice packet transmission A from the master to the slave (e.g., from base station to wireless headset) is longer than the voice packet transmission B from the slave to the master, as the voice packet transmission A contains the stereo voice data.

As shown in FIG. 11C, the Bluetooth A2DP music streaming timing protocol is substantially different than the mono and stereo voice protocols. First, there is no fixed transmission interval, as the transmissions are asynchronous. Second, the packet transmissions from the master to the slave are significantly longer (containing both left and right audio channels) than transmissions from the slave to the master (which containing only an ACK or NACK message). Thus, unlike the mono and stereo voice eSCO links, which are symmetric and have a short interval (7.5 ms for mono voice and 3.75 ms for stereo voice) with relative short packets (a few hundred microseconds in length), the A2DP streaming music link is asymmetric with long packets (several thousands of microseconds in length) in one direction and only a short control packet in the return direction, using a relatively long interval (about 14.5 ms).

As a result of these differences, different types of streaming audio users may have different interference effects on other streaming audio user sharing the same physical space and transmission spectrum. Voice users can interfere with other voice users when there is timing overlap and the same (or adjacent) carrier frequency is used. Usually, only a single dominating interferer is close enough and overlaps in time. However, due to the longer music packets in A2DP transmissions (about 2700 μs) and the short (about 400 μs) but frequent transmissions of voice users, the probability that an A2DP packet is interfered by one or more voice packets is relatively high.

To analyze the relative interference effects caused by voice audio and streaming audio (e.g., music) in a multi-user environment, the inventor has created and run a number of simulations. These simulations show that that the impact of voice interference—both on other voice transmissions and on streaming music transmissions—is much larger than the impact of streaming audio interference.

FIGS. 12A and 12B are graphs showing results of example simulations to show the impact of different types of wireless audio interference in a multi-user Bluetooth environment (e.g., a call center), in particular interference caused by wireless voice transmissions on other wireless voice and streaming music transmissions (FIG. 12A) and interference caused by wireless streaming music transmissions on other wireless voice and streaming music transmissions (FIG. 12B).

First, FIG. 12A shows three cumulative distribution function (CDF) curves of frame error rate (FER) experienced by voice users in an environment with N Bluetooth users, to show the effects of wireless voice transmissions on other wireless voice transmissions and on other streaming music transmissions. A first curve A represents a baseline CDF, wherein which 50% of the N users are active voice users, and the other 50% of the users are idle. In this baseline scenario, essentially 100% of the users experience a target FER of 1% or lower, a common target or limit FER for voice communications. A second CDF curve B represents the result of switching the idle users from the baseline scenario to streaming music users, such that of the N user, 50% are active voice users and 50% are active streaming music users. In contrast, a third CDF curve C represents the result of switching the idle users from the baseline scenario to additional voice users, such that 100% of the N users are active voice users. As shown by comparison of CDF curve B with CDF curve C, adding additional voice users to existing voice users has a greater effect on the existing voice users than adding streaming music users to the existing voice users.

Next, FIG. 12B shows three CDF curves of FER experienced by streaming music users in the environment of N Bluetooth users, to show the effects of wireless voice transmissions on other wireless voice transmissions and on other streaming music transmissions. A first curve D represents a baseline CDF, wherein which 50% of the N users are active streaming music users, and the other 50% of the users are idle. In this baseline scenario, about 73% of the users experience a target FER of 0.1% or lower, a common target or limit FER for streaming music. A second CDF curve E represents the result of switching the idle users from the baseline scenario to streaming music users, such that 100% of the N users are streaming music. In contrast, a third CDF curve F represents the result of switching the idle users from the baseline scenario to additional voice users. 50% of the N users are streaming music and the other 50% are active voice users. As shown by comparison of CDF curve E with CDF curve F, adding voice users to existing streaming music users has a greater effect on the streaming music users than adding additional streaming music users to the existing streaming music users.

Thus, based at least on the type of simulations shown in FIGS. 12A and 12B, the inventor has found that voice users have greater interference effects on other Bluetooth users in the environment, both on other voice users and on streaming audio users, than do streaming audio users. Thus, systems and methods of he present invention may account for such differences in interference effects caused by voice communications verses interference effects caused by streaming music, to thereby increase or optimize a total user density in an environment including a mix of voice and streaming audio users (e.g., a call center).

Further, some embodiments also account for a difference in allowable DER (e.g., FER) for voice transmissions versus streaming music transmissions, to further increase or optimize a total user density in an environment including a mix of voice and streaming audio users (e.g., a call center). For example, as discussed above, according to common standards a voice user is satisfied when the FER is below 1%, whereas a music user is satisfied when the FER is below 0.1%. Thus, because music users typically require a more stringent FER for acceptable performance (e.g., ≤0.1% FER) than voice users (e.g., ≤1% FER), the percentage of satisfied music users in a conventional scenario including a mix of voice users and music users is much lower than the percentage of satisfied voice users. Some embodiments provide systems and methods that account for such differences in acceptable DER (e.g., FER) for voice users versus music users, e.g., for optimizing a total user density in an environment including a mix of voice and music users (e.g., a call center). It should be noted that the FER for each user may depend on various factors, e.g., the distance to and activity of nearby users (interferers), the specific details of the physical space (e.g., furniture, walls, cubicles, reflecting surfaces, etc.), WiFi access points (as WiFi communications may interfere with Bluetooth communications), etc.

In view of the above, some embodiments of the present invention may address (a) different interference impacts of voice users and streaming audio users (e.g., music users), and/or (b) a difference in allowable DER (e.g., FER) between voice users and streaming audio users by selectively (e.g., dynamically) assigning wireless frequency channels (e.g., Bluetooth channels) between voice users and streaming audio users to separate voice communications from streaming audio communications, to thereby increase or optimize the total number of wireless users (e.g., Bluetooth headset users) in the relevant environment.

In some embodiments, a central controller in communication with a plurality of base stations (e.g., a central controller 120 in communication with a plurality of base stations 102 as shown in FIG. 2) is configured to dynamically control the assignment (and thus the usage) of individual wireless frequency channels to (a) voice communications, (b) streaming audio communications, or (c) other communication type(s) or protocol(s), based on a set of input including (i) the current number of voice users, (ii) the current number of streaming audio users, (iii) a target or threshold DER for voice users, (iv) a target or threshold DER for streaming audio users, and/or (v) any other relevant input parameters.

In a Bluetooth environment, the Bluetooth frequency spectrum may include a WiFi frequency spectrum, e.g., as a smaller subset of the Bluetooth spectrum. In such environment, the central controller may control (e.g., based on the various input parameters listed above) the assignment of each wireless frequency channel within the Bluetooth frequency spectrum to either (a) voice communications, (b) streaming audio communications, or (c) WiFi communications, to thereby (i) separate Bluetooth voice communications from Bluetooth streaming audio communications and (ii) separate Bluetooth communications (voice and streaming audio) from WiFi communications.

Example embodiments of the present invention in a Bluetooth embodiment are discussed below, in contrast to a conventional "shared spectrum" system, in which all users (including voice users and streaming audio users) share the same frequency spectrum.

FIGS. 13A and 13B show an example Bluetooth frequency channel assignment and example FER data for an example mixed-user scenario in a conventional system. First, FIG. 13A is a graph showing a Bluetooth frequency spectrum from 2400 MHz to 2483.5 MHz, which may include 79 (for example) discrete frequency channels or "carriers." An overlapping WiFi frequency spectrum may be contained within the Bluetooth frequency spectrum, defining a reduced number of Bluetooth carriers (e.g., 50) located outside of the WiFi range. In a conventional Bluetooth headset environment (e.g., call center) including a mixture of voice users and streaming audio users communicating with respective Bluetooth base stations, all 50 Bluetooth carriers are available to all headset users, including voice users and streaming audio users. At any given time, each Bluetooth link between a base station and headset (or multiple headsets) may operate as a voice data link, or as a streaming audio link, or may be idle, depending on the current behavior of the respective headset user(s), may hop between the 50 available Bluetooth carriers according to a defined frequency hopping protocol.

This conventional approach may be referred to as a "shared spectrum" approach, as all Bluetooth links in the environment, including voice data links and streaming audio links, share the same available Bluetooth spectrum (e.g., 50 Bluetooth carriers). In a shared spectrum environment, interference between the various Bluetooth links in the environment, which may include both voice data links and streaming audio links at any given time, may be unacceptable, depending on a variety of factors, such as the number of voice data links, the number of streaming audio links, the distances between the various headsets and base stations, etc.

FIG. 13B shows computer-simulated interference effects for example mixed-user scenarios in a conventional shared spectrum environment, i.e., where voice users and streaming audio users share the same available Bluetooth spectrum (e.g., 50 Bluetooth carriers). The example environment includes (a) an 8 by 8 array of 64 Bluetooth headset users linked to 64 base stations arranged in a 1000 m² space, in which half of the users (32) are voice users and half (32) are streaming music users, and (b) one WiFi access point also arranged in the space. This is a typical enterprise scenario, e.g., for a call center. The simulations assume that both the voice and music users avoid the WiFi spectrum and hop over the remaining 50 frequency carriers not occupied by the WiFi stations, e.g., as discussed above regarding FIG. 13A.

A first table 1300 shows interference effects for an example scenario in which the 32 voice users are mono voice users, and a second table 1302 shows interference effects for an example scenario in which the 32 voice users are stereo voice users. For the example environments represented by tables 1300 and 1302, a threshold FER of 1% is defined for voice communications, and a threshold FER of 0.1% is defined for streaming music, and a threshold of 5% outage is used for both voice and music users.

As shown in table 1300, simulations using 32 mono voice users mixed with 32 streaming music users show that only 0.3% of voice users exceed the 1% FER threshold for voice (i.e., 0.3% outage), but 50% of streaming music users exceed the 1% FER threshold for music (i.e., 50% outage). In other words, half of the streaming music users have an unsatisfactory link quality with a FER higher than 0.1%. This high outage rate (50%) for music users may be partially attributed to the more stringent FER requirement for music versus voice, and also to the longer packets used in the A2DP streams.

As shown in table 1302, simulations using 32 stereo voice users mixed with 32 streaming music users show that 2% of voice users exceed the 1% FER threshold for voice (i.e., 2% outage), and 70% of streaming music users exceed the 1% FER threshold for music (i.e., 70% outage), thus showing an outage increase for both voice and music users as compared with the results of the mono voice scenario shown in table 1300. Thus, in these example environments using a conventional shared spectrum approach, the interference effects—in particular interference experienced by streaming music users—are severe.

In view of the fact that the voice users in these example simulations exceed their performance targets (i.e., 0.3% outage for mono voice users and 2% outage for stereo voice users, both less than the 5% outage limit), the inventor has conceived the concept of assigning at least some, or all, voice links and streaming audio (e.g., music) links to separate carriers (frequency channels), to thereby reduce the interference effects between voice links and streaming audio links. For example, in some embodiments, some available Bluetooth carriers may be assigned for use only by voice users, or assigned for use only by streaming audio users, while other carriers may be used for both voice and streaming audio users at any given time. In other embodiments, all available Bluetooth carriers may be assigned for use only by voice users or for use only by streaming audio users, such that no carriers are shared by both voice users and streaming audio users at any given time. Thus, depending on the embodiment, carrier groups assigned to voice and carrier groups assigned to streaming audio may be partially overlapping or fully distinct (non-overlapping).

In some Bluetooth-based embodiments, WiFi communications are also present in the same environment as voice and/or streaming audio links between headsets and base stations. As discussed above, the WiFi spectrum is located within the Bluetooth spectrum. Thus, in embodiments in which WiFi is also present in the relevant environment, a central controller may define (and in some embodiments, dynamically adjust over time) three groups of frequency carriers: (1) a WiFi carrier group: carriers reserved for WiFi communications and restricted from voice and streaming Bluetooth users, (2) a voice carrier group: carriers assigned exclusively to Bluetooth voice users, and (3) a streaming audio (e.g., music) carrier group: carriers assigned exclusively to Bluetooth streaming audio users (e.g., music users). In some embodiments, the carriers of each of the three groups are selected out of the 79 available Bluetooth carriers.

In some embodiments, a central controller may dynamically assign individual carriers or groups of carriers to (a) voice users only, (b) streaming audio users only, or (c) WiFi communications only, to thereby (i) separate Bluetooth voice communications from Bluetooth streaming audio communications and (ii) separate Bluetooth communications (voice and streaming audio) from WiFi communications. (In a scenario or environment with no WiFi presence, the central controller may dynamically assign individual carriers or groups of carriers to (a) voice users only or (b) streaming audio users only). The central controller may dynamically control such carrier assignment based on a set of input data including, for example:

(a) a current number of voice users,
(b) a current number of streaming audio users,
(c) a current number of idle users,
(d) a target or threshold DER for voice users,
(e) a measured or determined DER for voice users,
(f) a target or threshold outage rate for voice users,
(g) a measured or determined outage rate for voice users,
(h) a target or threshold DER for streaming audio users,
(i) a measured or determined DER for streaming audio users,
(j) a target or threshold outage rate for streaming audio users,
(k) a measured or determined outage rate for streaming audio users,
(l) the presence or absence of WiFi communications, and/or
(m) any other relevant input parameters.

In some embodiments, if the central controller determines that the current outage rate for voice users is below a target or threshold outage rate, while the current outage rate for streaming audio users is above a target or threshold outage rate, the central controller may reassign one or more carriers from voice users to streaming audio users, for example, until the outage rate for voice users reaches the target or threshold outage rate. Such adjustment may decrease the streaming audio outage rate, while maintaining the voice outage rate at or within the voice outage limit. The central controller may similarly reassign one or more carriers from streaming audio users to voice users in response to the opposite scenario.

The assignment of carriers to voice users or streaming audio users, to thereby separate such communications, can result in a significant reduction in interference experienced by the various Bluetooth users, especially streaming audio users, as such users are particularly affected by interference from voice communications in a conventional shared spectrum approach, as discussed above regarding FIGS. 13A-13B.

FIGS. 14A-14C show example Bluetooth frequency carrier assignments and example FER data for example mixed-user scenarios according to example embodiments of the invention. As with the example conventional approach shown in FIGS. 13A-13B and discussed above, the example environment for the embodiments shown in FIGS. 14A-14C includes (a) an 8 by 8 array of 64 Bluetooth headset users linked to 64 base stations arranged in a 1000 m$^2$ space, in which half of the users (32) are voice users and half (32) are streaming music users, and (b) one WiFi access point also arranged in the space. As with the conventional approach discussed above, it is assumed that that both the voice and music users avoid the WiFi spectrum and hop over the remaining 50 frequency carriers not occupied by the WiFi stations. In addition, the example embodiments shown in FIGS. 14A-14C use the same FER thresholds as the example conventional approach shown in FIGS. 13A-13B, namely a FER threshold of 1% for voice users and FER threshold of 0.1% for streaming audio users.

In the example embodiments shown in FIGS. 14A-14C, the central controller is configured to assign Bluetooth frequency carriers in a clustered manner. In particular, the central controller may assign a first cluster of carriers to voice links and a second cluster of carriers to streaming audio links, separate from the first group of carriers. In this context, a "cluster" of carriers means a consecutive group of carriers assigned to one type of Bluetooth communication (voice or streaming audio) with are no intervening carriers of the other type (streaming audio or voice), although there may be intervening carriers reserved for WiFi, e.g., as shown in both FIG. 14A and FIG. 14B.

In addition, in these example embodiments, the central controller is programmed to adjust the carrier assignment to achieve a 5% voice user outage, for example by reassigning one or more carriers from voice users to streaming audio users if the current outage rate for voice users is below the 5% limit, to thereby decrease (improve) the streaming audio outage rate. Thus, as shown in tables 1400 and 1402 of FIG. 14C, the central controller may adjust the carrier assignment until the voice user outage reaches 5%.

FIG. 14A and table 1400 of FIG. 14C show a simulation of an example carrier assignment and resulting DER data for a mixed-user scenario with 32 mono voice users and 32 streaming audio users, while FIG. 14B and table 1402 of FIG. 14C show a simulation of an example carrier assignment and resulting DER data for a mixed-user scenario with 32 stereo voice users and 32 streaming audio users. Tables 1400 and 1402 correspond generally to tables 1300 and 1302 for the conventional approach shown in FIG. 13B, discussed above. Also, it should be understood that the actual numbers of voice and music carriers shown in FIGS. 14A and 14B are representative only, to illustrate the concept of clustered carrier assignment.

As shown in table 1400, in the simulation of the mono voice scenario (32 mono voice users and 32 streaming audio users), the central controller assigned and reassigned individual carriers until the outage rate for voice users reached the 5% limit, at which point 13 of the 50 available (non-WiFi) carriers were assigned to voice users, and the remaining 37 carriers were assigned to streaming audio users. As shown, the resulting streaming audio outage was 21%, as compared with 50% in the conventional approach shown in table 1300 of FIG. 13B.

Next, referring to table 1402, in the simulation of the stereo voice scenario (32 stereo voice users and 32 streaming audio users), as with the mono voice scenario, the central controller adjusted the carrier assignments until the outage rate for voice users reached the 5% limit, at which point 22 of the 50 available (non-WiFi) carriers were assigned to voice users, and the remaining 28 carriers were assigned to streaming audio users. As shown, the resulting streaming audio outage was 33%, as compared with 70% in the conventional approach shown in table 1302 of FIG. 13B.

Thus, the overall outage may be substantially reduced by assigning separate carriers for voice users and streaming audio users. For example, as compared with the example conventional approach shown in FIGS. 13A-13B, the inventive approach shown in FIGS. 14A-14C reduced the streaming audio outage by more than half, for both the mono voice scenario (table 1400) and the stereo voice scenario (table 1402).

As discussed above, in the embodiments shown in FIGS. 14A-14C, the central controller is configured to assign consecutive "clusters" of carriers to voice users and streaming audio users, respectively. In other embodiments, the central controller may be configured to assign carriers to voice links and streaming audio links in a non-clustered manner, or a minimally-clustered manner. For example, the central controller may assign carriers to voice links and streaming audio links in an alternating manner or an otherwise intermixed manner.

Figure 15:
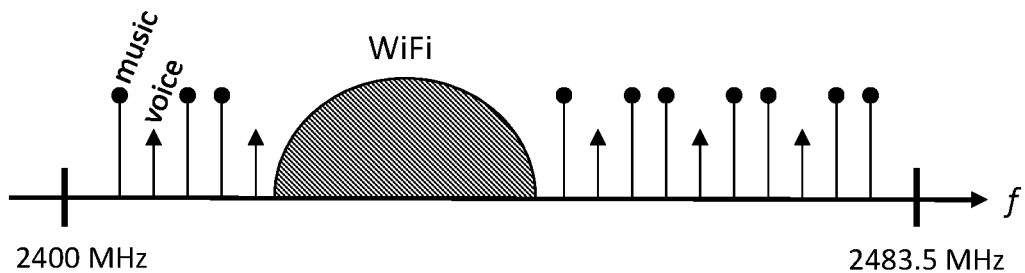
FIG. 15 is a graph showing example Bluetooth carrier distributions according to another embodiment of the invention, in which separate carriers are assigned to voice users and streaming audio users in a non-clustered (e.g., alternating) manner.

FIG. 15 shows an example carrier assignment for a mixed-user scenario with voice users and streaming audio users, according to an example embodiment of the invention. As shown, a central controller may assign Bluetooth carriers in an alternating manner in which each voice carrier is separated from an adjacent voice carrier by a pair of streaming audio carriers. Such non-clustered assignment of carriers may further improve the resulting DER and/or outage performance in the environment, e.g., as compared with the clustered approach of FIGS. 14A-14C. For example, a non-clustered approach may at least partially counter the effects of frequency-selective fading (Rayleigh fading) that may be present in the relevant environment. For instance, with a non-clustered carrier assignment, if one packet is sent on a carrier in a fading dip, the following retransmission may be sent on a carrier that is sufficiently distant from the fading dip to avoid fading. That is, a non-clustered approach may provide a particularly robust performance in such environments.

Figure 16:
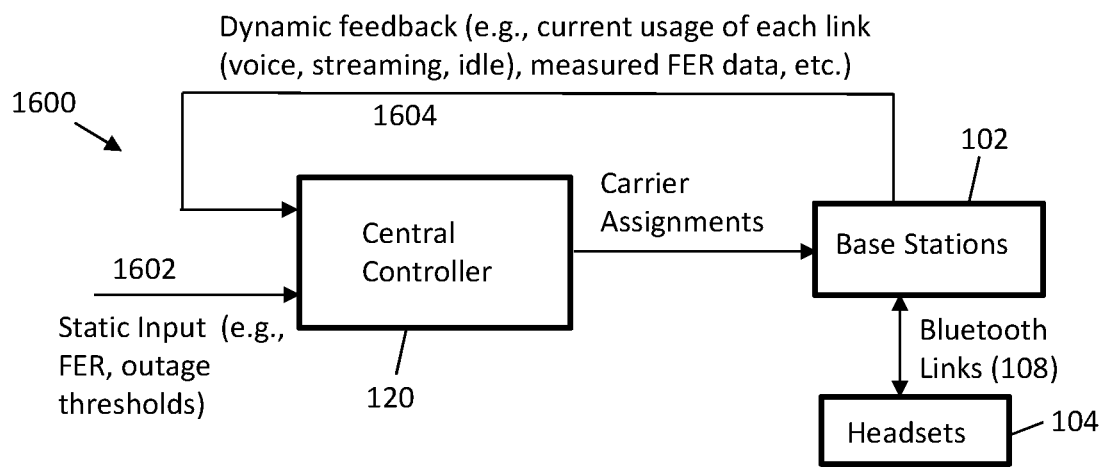
FIG. 16 shows an example controller for dynamic assignment of frequency carriers to voice users and streaming audio users, e.g., for improved outage results.

FIG. 16 shows an example control system 1600 for dynamic assignment of frequency carriers to voice users and streaming audio users in a mixed-user environment, e.g., for improved outage results, according to an example embodiment of the invention. The mixed-user environment may include multiple headset users 104 wirelessly connected to multiple base stations 102 by multiple wireless links, for communications via a wireless protocol (e.g., Bluetooth) having a defined frequency spectrum including a group of frequency channels, or carriers. At any given time, the multiple headset users 104 may include one or more voice users and one or more streaming audio users (e.g., streaming music users).

A central controller 120 communicatively connected to the multiple base stations 102 (e.g., via wired or wireless links) may be configured to dynamically assign the carriers in the frequency spectrum to voice links or streaming audio links, to thereby separate voice communications from streaming audio communications. Central controller 120 may implement any of the example embodiments or implementations discussed above.

As shown, central controller 120 may dynamically determine carrier assignments based on various inputs, which may include (a) static input 1602, e.g., received as user input or otherwise received or accessed by controller 120 and (b) dynamic feedback 1604, e.g., from the multiple base stations 102. Static input 1602 may include, for example, threshold FER and/or outage values for voice users, threshold FER and/or outage values for voice streaming audio users, the presence or absence of WiFi in the environment, etc. Dynamic feedback 1604 may include, for example, information determined by base stations 102, e.g., based on communications with respective headsets 104. For example, each base station 102 may determine, and send as dynamic feedback 1604, any of the following link usage data associated with the base station 102; link quality data for each Bluetooth link associated with the base station 102; and/or other relevant data. In some embodiments, base stations 102 may communicate dynamic feedback 1604, including link usage data and/or link quality data, to the central controller 120 via a Bluetooth low energy channel or other low-rate control channel.

Link usage data for each base station 102 may indicating a current link usage of each Bluetooth link, such as (a) voice communications (and may further indicate a type of voice link, e.g., mono voice or stereo voice), (b) streaming audio communications (and may further indicate a type of streaming audio communications), or (d) idle. Link quality data for each base station 102 may indicate, for example, a measured DER (e.g., FER) or other measured performance parameter regarding communications between the base station 102 and one or more Bluetooth headsets.

Each base station 102 may detect or determine the link usage data and/or link quality data associated with that base station 102 at any defined frequency or schedule, or in response to defined events or changes detected by the base station 102, e.g., in response to an update request or other communication received from the central controller 120. Further, each base station 102 may communicate dynamic feedback 1604 to central controller 120 (including link usage data, link quality data, or both) at any defined frequency or schedule, or in response to defined events or changes detected by the base station 102 (e.g., a detected change in current link usage between voice, streaming audio, and idle; or a change in measured DER).

Central controller 120 may include or have access to any suitable hardware, software, and/or firmware configured to execute any suitable algorithms to dynamically determine carrier assignments based on static input 1602 and/or dynamic feedback 1604. Central controller 120 may determine and/or adjust carrier assignments at any defined frequency or schedule, or in response to defined events, e.g., dynamic feedback 1604 from one or more base stations indicating a change in DER data for one or more headset users. In some embodiments, controller 120 may include or execute at least one proportional controller, e.g., a PID controller or PI controller, for dynamically determining carrier assignments.

Figure 17:
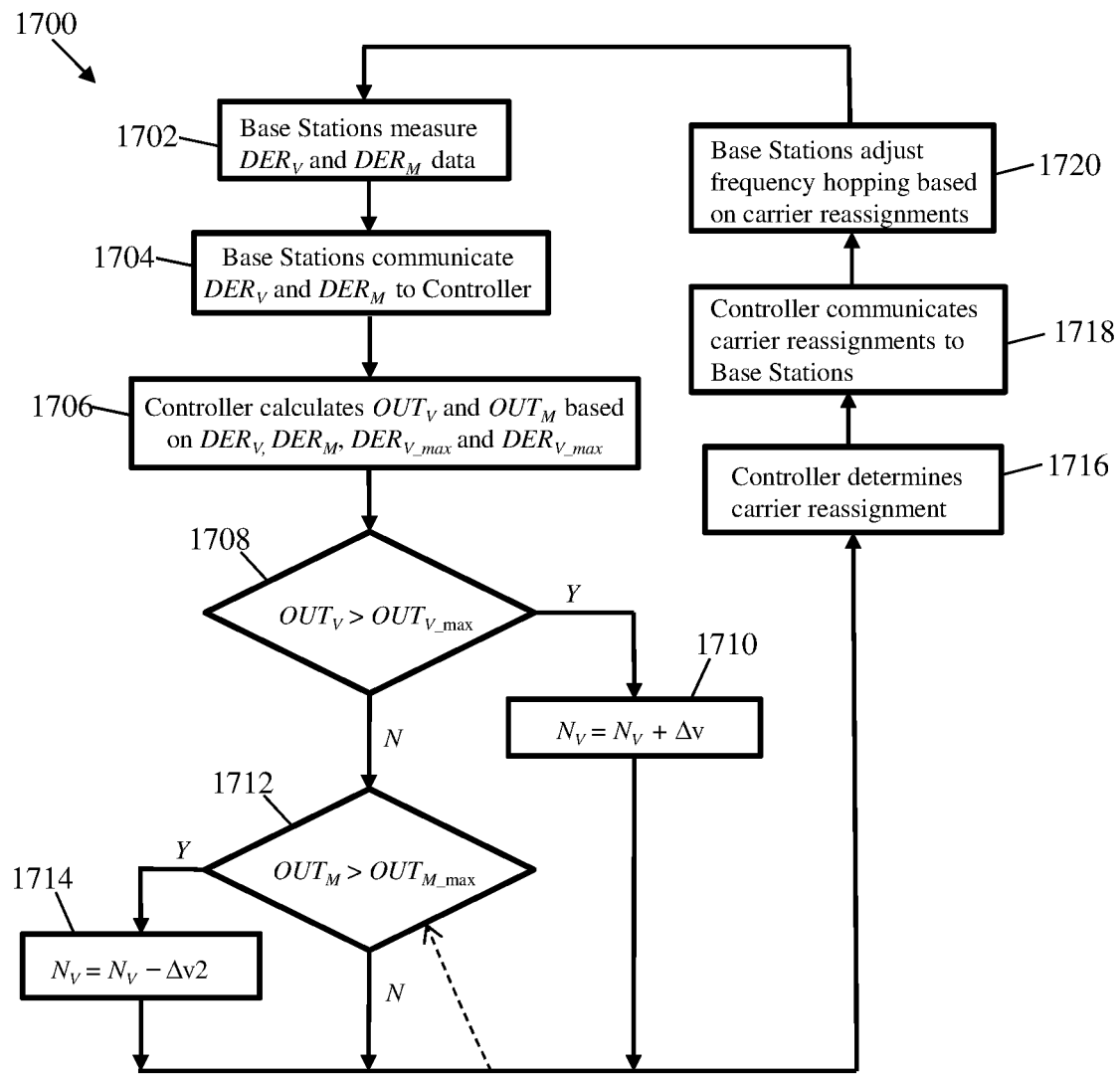
FIG. 17 shows an example PID controller for dynamically assigning carriers to voice users or streaming audio users, according to an example embodiment of the invention.

FIG. 17 shows one example algorithm 1700 for dynamically controlling carrier assignment in a mixed-user environment including both voice users and streaming audio users, according to an example embodiment of the invention. In some embodiments, algorithm 1700 may be executed by central controller 120 or any other controller associated with the mixed-user environment. Algorithm 1700 is discussed in the context of streaming music, but may be similarly applied for any other type of streaming audio.

At 1702, one or more base stations 102 measure data error rates (DER), e.g., frame error rates (FER) for their respective headset users 104, at any suitable frequency or times (wherein base stations 102 may or may not perform such measurements in a synchronized manner). At 1704, base stations 102 may communicate various data to the central controller 120, including at least (a) the link usage data indicating the current usage of wireless links with their respective headset users (e.g., voice, streaming music, or idle), and (b) measured DER data for their respective headset users, including $DER_V$ for voice users and $DER_M$ for music users.

At 1706, the central controller 120 calculate a current outage rate $OUT_V$ for voice users and/or a current outage rate $OUT_M$ for music users based on (a) link usage data and (b) DER data (e.g., $DER_V$ and $DER_M$) received from base station(s) 102 at step 1704. The central controller 120 may calculate $OUT_V$ based on (a) $DER_V$ received from base stations 102 carrying voice and (b) a defined outage threshold for voice users, $DER_{V\_max}$, beyond which a voice outage is defined, for example 1% DER as discussed above. Similarly, controller 120 may calculate $OUT_M$ based on (a) $DER_M$ received from base stations 102 carrying streaming music and (b) a defined DER threshold for music users, $DER_{M\_max}$, beyond which a music outage is defined, for example 0.1% DER as discussed above. Controller 120 may obtain values for $DER_{V\_max}$ and $DER_{M\_max}$ from storage, from base station(s) 120, or from any other source. In some embodiments, $DER_{V\_max}$ and $DER_{M\_max}$ may be defined and/or adjusted by a user via any suitable user input.

In some embodiments, the calculation of $OUT_V$ and $OUT_M$ by controller 120 may involve generating a $CDF_V$ for voice users and a $CDF_M$ for music users, and determining $OUT_V$ and $OUT_M$ based on $CDF_V$ and $CDF_M$, respectively. Depending on the particular embodiment, controller 120 may recalculate each of $OUT_V$ and $OUT_M$ at any defined frequency or in response to any defined triggering event. For example, controller 120 may recalculate $OUT_V$ each time new $DER_V$ data is received from any base station 102 or each time new $DER_V$ data is received from a defined number or percentage of base stations 102 currently providing voice communications, and similarly recalculate $OUT_M$ each time new $DER_M$ data is received from any base station 102 or each time new $DER_M$ data is received from a defined number or percentage of base stations 102 currently providing music communications.

Controller 120 may then analyze the current outage data $OUT_V$ and/or $OUT_M$ to determine whether to reassign one or more carriers from voice to music or vice versa. In some embodiments, including the example embodiment shown in FIG. 17, controller 120 may prioritize voice outage over music outage, as voice quality may be more critical than music quality, e.g., in a call center. Thus, in some embodiments, controller 120 may prioritize a target of remaining at or below a defined outage limit for voice, $OUT_{V\_max}$ (e.g., 5%) over a target of remaining at or below a defined outage limit for music, $OUT_{M\_max}$ (e.g., 10%). As with DER limits $DER_{V\_max}$ and $DER_{M\_max}$ discussed above, controller 120 may obtain values for outage limits $OUT_{V\_max}$ and $OUT_{M\_max}$ from storage, from base station(s) 120, or from any other source. In some embodiments, outage limits $OUT_{V\_max}$ and $OUT_{M\_max}$ may be defined and/or adjusted by a user via any suitable user input.

Thus, in algorithm 1700, controller 120 may first analyze at 1708 whether the current voice outage $OUT_V$ is above the defined voice outage limit $OUT_{V\_max}$. If so, controller 120 determines to reassign a number of carriers, $\Delta v1$, from music to voice communications at step 1710. If not, i.e., if the current voice outage $OUT_V$ is within the outage limit $OUT_{V\_max}$, controller 120 then evaluate the music outage. Thus, at step 1712, controller 120 may analyze at 1712 whether the current music outage $OUT_M$ is above the defined music outage limit $OUT_{M\_max}$. If so, controller 120 determines to reassign a number of carriers, $\Delta v2$, from voice to music communications at step 1714. Each of $\Delta v1$ and $\Delta v2$ may represent a set number of voice carriers (e.g., 1, 2, 3, etc.), or may be determined based on any suitable function or algorithm. For example, $\Delta v1$ may be determined as a proportional function of a difference between $OUT_V$ and $OUT_{V\_max}$ determined at 1708, and $\Delta v2$ may be determined as a proportional function of a difference between $OUT_M$ and $OUT_{M\_max}$, determined at 1714. $\Delta v2$ may be the same as, less than, or greater than $\Delta v1$.

In an alternative embodiment, step 1712 may analyze (a) whether the current music outage $OUT_M$ is above the defined music outage limit $OUT_{M\_max}$ and (b) whether the current voice outage $OUT_V$ is below a defined percentage of the voice outage limit $OUT_{V\_max}$, for example, 70%, 80%, or 90% of $OUT_{V\_max}$. The method advances to step 1714 to reassign a number of carriers $\Delta v2$ from voice to music communications only if both inquiries (a) and (b) are answered in the affirmative. The further requirement that the current voice outage $OUT_V$ be below a defined percentage of the voice outage limit $OUT_{V\_max}$, in order to reassign carrier(s) from voice to music may reduce or avoid undesirable hysteresis effects or oscillation of $OUT_V$ about the limit $OUT_{V\_max}$, may lead to needless or excessive reassignment of carriers.

After determines to reassign $\Delta v1$ carrier(s) from music to voice (at step 1710) or $\Delta v2$ carriers from voice to music (at step 1714), controller 120 may then determine the actual carrier reassignments at step 1716 using any suitable protocol or algorithm. For example, in an embodiment in which carriers are assigned to voice and streaming music user in clusters, e.g., as shown in example FIGS. 14A and 14B, controller 120 may increase or reduce the size of the voice carrier cluster by $\Delta v1$ or $\Delta v2$, which thus decreases or increases the size of the music carrier cluster. As another example, in an embodiment in which carriers are assigned to voice and streaming music user in a non-clustered manner, such as in a alternating or otherwise dispersed manner, e.g., as shown in example FIG. 15, controller 120 may reassign one or more carriers from music to voice, or voice to music, in a manner that avoids or minimizes any clustering of voice carriers (e.g., consecutive runs of voice carriers in the available frequency spectrum) and music carriers (e.g., consecutive runs of streaming music carriers in the available frequency spectrum), or in other words, in a manner that maximizes both the dispersion of voice carriers throughout the frequency spectrum and the dispersion of streaming music carriers throughout the frequency spectrum.

Controller 120 may then communicate the carrier reassignments to each base station 102 at step 1718. At step 1720, each base station 102 may then determine whether the carrier reassignments affect that base station's current operation, and if so, adjust its operation accordingly, by using only the carriers assigned (according to the reassignment) to the current link usage (e.g., voice or music) of that base station. Thus, in a frequency-hopping implementation, each base station 102 may restrict its frequency hopping to the carriers assigned to the current link usage (e.g., voice or music) of that base station.

After adjusting their operation based on the carrier reassignments, the method may then return to step 1702, where base stations 102 may continue to measure communication performance, in particular $DER_V$ for voice users and $DER_M$ for music users, and the method may continue in this manner to provide recurring and dynamic analysis and adjustment of the carrier assignments between voice and music users.

In another embodiment, the central controller 120 may determine and dynamically adjust carrier assignments (e.g., between voice and streaming audio) based on the current numbers of voice users and streaming audio users in the relevant environment, and without requiring link quality data. For example, central controller 120 may use a mathematical formula, algorithm, or lookup table to determine a number of carriers to assign to voice and a number of carriers to assign to streaming audio, based on the current numbers of voice users and streaming audio users. Such formula, algorithm, or lookup table may be designed to optimize link quality (e.g., for voice users, streaming audio users, or both), outage rates (e.g., for voice users, streaming audio users, or both), and/or potential user density, and may be defined or generated based on historical data and/or computer-based simulations. As one example in a Bluetooth environment, controller 120 may apply a formula that specifies a percentage of available Bluetooth carriers to assign to voice users as a proportional, exponential, or other mathematical function of the current percentage of voice users in the relevant environment.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method for managing audio communications in a mixed-user wireless audio environment including a plurality of wireless audio links communicating audio data between a plurality of wireless communications devices according to a wireless communications protocol having a defined frequency spectrum, the plurality of wireless audio links including at least one voice link carrying voice data and at least one streaming audio link carrying streaming audio data, the method comprising: receiving, at a central controller, wireless link data associated with at least one of the plurality of wireless audio links; wherein the received wireless link data includes, for each wireless audio link, link usage data indicating whether the respective wireless audio link is a voice link carrying voice data or a streaming audio link carrying streaming audio data; generating or adjusting channel assignment data, by the central controller, based at least on the received wireless link data, the channel assignment data defining: a set of voice channels designated for voice links, the set of voice channels comprising a first set of frequency channels in the defined frequency spectrum of the wireless communications protocol; and a set of streaming audio channels designated for streaming audio links, the set of streaming audio channels comprising a second set of frequency channels, different than the first set of frequency channels, in the defined frequency spectrum of the wireless communication protocol; and communicating at least a portion of the channel assignment data from the central controller to at least one of the plurality of wireless communication devices; and generating or adjusting the channel assignment data, by the central controller, based at least on (a) link usage data and (b) link quality data, wherein the received wireless link data for each wireless audio link further includes the link quality data indicating a quality of the respective wireless audio link, wherein: the received link quality data indicates data error rate information for at least some of the plurality of wireless audio links; and generating or adjusting the channel assignment data, by the central controller, based at least on (a) the link usage data and (b) the link quality data comprises: determining, based on the link usage data and the link quality data, a collective data error rate metric representing a number or percentage of the voice links having a data error rate above a defined threshold value; comparing the collective data error rate metric to a target collective data error rate; and adjusting an assignment of at least one frequency channel based on the comparison of the collective data error rate metric to the target collective data error rate.

2. A method for managing audio communications in a mixed-user wireless audio environment including a plurality of wireless audio links communicating audio data between a plurality of wireless communications devices according to a wireless communications protocol having a defined frequency spectrum, the plurality of wireless audio links including at least one voice link carrying voice data and at least one streaming audio link carrying streaming audio data, the method comprising: receiving, at a central controller, wireless link data associated with at least one of the plurality of wireless audio links; wherein the received wireless link data includes, for each wireless audio link, link usage data indicating whether the respective wireless audio link is a voice link carrying voice data or a streaming audio link carrying streaming audio data; generating or adjusting channel assignment data, by the central controller, based at least on the received wireless link data, the channel assignment data defining: a set of voice channels designated for voice links, the set of voice channels comprising a first set of frequency channels in the defined frequency spectrum of the wireless communications protocol; and a set of streaming audio channels designated for streaming audio links, the set of streaming audio channels comprising a second set of frequency channels, different than the first set of frequency channels, in the defined frequency spectrum of the wireless communication protocol; and communicating at least a portion of the channel assignment data from the central controller to at least one of the plurality of wireless communication devices; and generating or adjusting the channel assignment data, by the central controller, based at least on (a) link usage data and (b) link quality data, wherein the received wireless link data for each wireless audio link further includes the link quality data indicating a quality of the respective wireless audio link, wherein: the received link quality data indicates data error rate information for at least some of the plurality of wireless audio links; and generating or adjusting the channel assignment data, by the central controller, based at least on (a) the link usage data and (b) the link quality data comprises: determining, based on the link usage data and the link quality data, a collective data error rate metric representing a number or percentage of the streaming audio links having a data error rate above a defined threshold value; comparing the collective data error rate metric to a target collective data error rate; and adjusting an assignment of at least one frequency channel based on the comparison of the collective data error rate metric to the target collective data error rate.

3. The method of claim 1 wherein: each wireless audio link comprises a link between a base station and a user audio device;

and the method further includes a respective base station dynamically controlling a set of one or more frequency channels used for communicating audio data via a respective wireless audio link associated with the respective base station based on (a) channel assignment data received from the central controller and (b) whether the respective wireless audio link is currently a voice link or a streaming audio link.

4. A system comprising:

a central controller to:

receive, from a communications device via a wireless link, link data that indicates whether the wireless link is a voice link or a streaming audio link, and generate or adjust, based on the link data, channel assignment data that defines a set of voice channels in the voice link and a set of streaming audio channels in the streaming audio link.

5. The system of claim 4, wherein the central controller is to communicate, in response to generating the channel assignment data, the channel assignment data to the communications device.

6. The system of claim 4, wherein the communications device is to receive, from the central controller, the channel assignment data.

7. The system of claim 6, wherein the communications device is to control, based on the channel assignment data, frequency channels used for audio communications with a client device.

8. The system of claim 7, wherein the communications device is to control, based on the channel assignment data, a current link usage of the wireless link with the client device.

9. The system of system of claim 7, wherein the set of voice channels is a data link between the client device and the communications device.

10. The system of system of claim 7, wherein the set of streaming audio channels is a data link between the client device and the communications device.

11. The system of claim 4, wherein the set of voice channels is to carry voice data.

12. The system of claim 4, wherein the set of streaming audio channels is to carry streaming audio data.

13. The system of claim 4, wherein the link data further includes link quality data indicating quality of the wireless link.

14. The system of claim 4, wherein the set of voice channels comprises a first set of frequency channels in a defined frequency spectrum.

15. The system of claim 14, wherein the defined frequency spectrum comprises a frequency spectrum for a wireless communications protocol.

16. The system of claim 14, wherein the defined frequency spectrum comprises a Bluetooth frequency spectrum.

17. The system of claim 14, wherein the set of streaming audio channels comprises the second set of frequency channels in the defined frequency spectrum.

18. The system of claim 17, wherein the first set of frequency channels is distinct from and non-overlapping with a second set of frequency channels.

19. The system of claim 17, wherein the second set of frequency channels is different from the first set of frequency channels.

20. The system of claim 17, wherein the central controller is to dynamically adjust a number of frequency channels in the first set of frequency channels and the second set of frequency channels based on a current distribution of set of voice channels and set of streaming audio channels.

21. The system of claim 14, wherein the central controller is to increase, in response to an outage rate for set of voice channels exceeding a predetermined voice outage threshold, an amount of frequency channels in the first set of frequency channels.

22. The system of claim 21, wherein the central controller is to calculate the outage rate for set of voice channels.

23. The system of claim 4, wherein the central controller is to calculate an outage rate for the set of streaming audio channels based on the link data from multiple communications devices.

* * * * *